(12) United States Patent
Tashima et al.

(10) Patent No.: US 12,433,548 B2
(45) Date of Patent: Oct. 7, 2025

(54) MEDICAL IMAGE PROCESSING DEVICE, COMPUTER PROGRAM, AND NUCLEAR MEDICINE DEVICE

(71) Applicant: NATIONAL INSTITUTES FOR QUANTUM SCIENCE AND TECHNOLOGY, Chiba (JP)

(72) Inventors: Hideaki Tashima, Chiba (JP); Taiga Yamaya, Chiba (JP)

(73) Assignee: NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 507 days.

(21) Appl. No.: 17/907,923

(22) PCT Filed: Mar. 4, 2021

(86) PCT No.: PCT/JP2021/008383
§ 371 (c)(1),
(2) Date: Mar. 28, 2023

(87) PCT Pub. No.: WO2021/182281
PCT Pub. Date: Sep. 16, 2021

(65) Prior Publication Data
US 2023/0218243 A1 Jul. 13, 2023

(30) Foreign Application Priority Data
Mar. 13, 2020 (JP) .................. 2020-044795

(51) Int. Cl.
*A61B 6/03* (2006.01)
*A61B 6/42* (2024.01)
(Continued)

(52) U.S. Cl.
CPC ............ *A61B 6/037* (2013.01); *A61B 6/4258* (2013.01); *G01N 23/20066* (2013.01);
(Continued)

(58) Field of Classification Search
CPC ..... A61B 6/037; A61B 6/5205; A61B 6/5235; A61B 6/4417; A61B 6/4266; A61B 6/4258
See application file for complete search history.

(56) References Cited

U.S. PATENT DOCUMENTS 8,847,166 B2  9/2014  Fukuchi et al.
9,031,303 B2  5/2015  Yamaguchi
(Continued)

FOREIGN PATENT DOCUMENTS

JP  2000-028732 A  1/2000
JP  2014-052353 A  3/2014
(Continued)

OTHER PUBLICATIONS

Apr. 27, 2021 International Search Report issued in Patent Application No. PCT/JP2021/008383.
(Continued)

*Primary Examiner* — David P Porta
*Assistant Examiner* — Casey Bryant
(74) *Attorney, Agent, or Firm* — Oliff PLC

(57) ABSTRACT

An image is reconstituted by iterative approximation, a PET event updated image is produced by updating a current image using a PET event, a Compton event updated image is produced by updating the current image using a Compton event, the PET event updated image and the Compton event updated image that have been independently produced are weighted and added together, and the current image is updated using an image obtained by addition processing. In this way, PET events and Compton events, which have different properties, can be used in combination to efficiently and stably reconstitute images, improving image quality.

16 Claims, 24 Drawing Sheets

(51) Int. Cl.
  *G01N 23/20066* (2018.01)
  *G06T 7/00* (2017.01)
  *G06T 11/00* (2006.01)
(52) U.S. Cl.
  CPC .......... *G06T 7/0012* (2013.01); *G06T 11/003* (2013.01); *G06T 2207/10104* (2013.01)

(56) References Cited

U.S. PATENT DOCUMENTS

| | | | |
|---|---|---|---|
| 2013/0334429 A1 | 12/2013 | Fukuchi et al. | |
| 2014/0072200 A1 | 3/2014 | Yamaguchi | |
| 2018/0239037 A1* | 8/2018 | Yamaya | G01T 1/1647 |
| 2019/0066342 A1* | 2/2019 | Zhu | G06T 11/005 |
| 2019/0353808 A1* | 11/2019 | Watanabe | G01T 1/2985 |
| 2022/0334268 A1* | 10/2022 | Lee | G01T 1/2985 |

FOREIGN PATENT DOCUMENTS

| | | |
|---|---|---|
| JP | 2018-136152 A | 8/2018 |
| WO | 2012/077468 A1 | 6/2012 |

OTHER PUBLICATIONS

Chinn, G. et al., "A method to include single photon events in image reconstruction for a 1 mm resolution PET system built with advanced 3-D positioning detectors.", IEEE Nuclear Science Symposium Conference Record, (2006), pp. 1740-1745.

Presentation slide of the relevant invention used at the World Molecular Imaging Congress 2019, Canada.

Abstract of the relevant invention published in the website of Springer Nature; (https://link.springer.com/article/10.1007/s11307-019-01453-z).

Presentation slide of the relevant invention used at the IEEE Nuclear Science Symposium (NSS) and Medical Imaging Conference 2019, England.

Abstract of the relevant invention published in the website of IEEE;(https://www.eventclass.org/contxt_ieee2019/online-program/session?s=MIC-19).

Presentation slide of the relevant invention used at the PET Imaging Physics Research Society 2020, JAPAN.

Report which the relevant invention was published in the 2019 report on PET Imaging Physics Research, Japan.

* cited by examiner

FIG. 3

Initialize: $f_j^0$ $f_j^{k,0} = f_j^k$ $$f_j^{k,l+1} = \beta \frac{f_j^{k,l}}{C_j^P} \sum_{t \in S_l^P} a_{t,j}^P \left( \frac{\delta_t}{\sum_{j'} a_{t,j'}^P f_{j'}^{k,l}} \right) + (1-\beta) \frac{f_j^{k,l}}{C_j^C} \sum_{t \in S_l^C} a_{t,j}^C \frac{\delta_t}{\sum_{j'} a_{t,j'}^C f_{j'}^{k,l}} \quad (l = 0,1,2,...,L-1)$$

$f_j^{k+1} = f_j^{k,L}$ $C_j^P = \frac{1}{L} \sum_{i=0}^{I^P} a_{ij}^P \qquad C_j^C = \frac{1}{L} \sum_{i=0}^{I^C} a_{ij}^C$ $f$: IMAGE
$\beta$: WEIGHT FOR WEIGHTED AVERAGE $(0 < \beta < 1)$
$C$: OVERALL SENSITIVITY IMAGE
$a$: SYSTEM MATRIX
$S$: SUBSET
$L$: NUMBER OF SUBSETS
$\delta$: 1 FOR PROMPT EVENT, −1 FOR DELAYED COINCIDENCE EVENT $i$: INDEX OF PROJECTION DATA SPACE
$j$: INDEX OF IMAGE SPACE
$k$: NUMBER OF TIMES OF ITERATIONS
$l$: NUMBER OF TIMES OF SUB ITERATIONS
$t$: INDEX OF LIST MODE EVENT

SUPERSCRIPT $P$: PET EVENT
SUPERSCRIPT $C$: COMPTON EVENT

FIG. 6

Initialize: $f_j^0$ $f_j^{P,k,0} = f_j^{C,k,0} = f_j^k$ $f_j^{P,k,n_P+1} = \dfrac{f_j^{P,k,n_P}}{C_j^P} \sum_{t \in S_l^P} a_{t,j}^P \left( \dfrac{\delta_t}{\sum_{j'} a_{t,j'}^P f_{j'}^{P,k,n_P}} \right) \bigg|_{l = k N_P + n_P \bmod L_P}$ $f_j^{C,k,n_C+1} = \dfrac{f_j^{C,k,n_C}}{C_j^C} \sum_{t \in S_l^C} a_{t,j}^C \left( \dfrac{\delta_t}{\sum_{j'} a_{t,j'}^C f_{j'}^{C,k,n_C}} \right) \bigg|_{l = k N_C + n_C \bmod L_C}$ $f_j^{k+1} = \beta f_j^{P,k,N_P} + (1-\beta) f_j^{C,k,N_C}$ $C_j^P = \dfrac{1}{L} \sum_{i=0}^{I^P} a_{i,j}^P \qquad C_j^C = \dfrac{1}{L} \sum_{i=0}^{I^C} a_{i,j}^C$ $f$: IMAGE
$\beta$: WEIGHT FOR WEIGHTED AVERAGE ($0 < \beta < 1$)
$C$: OVERALL SENSITIVITY IMAGE
$a$: SYSTEM MATRIX
$S$: SUBSET
$L$: NUMBER OF SUBSETS
$N$: NUMBER OF TIMES OF SUB ITERATIONS PER MAIN ITERATION
$\delta$: 1 FOR PROMPT EVENT, -1 FOR DELAYED COINCIDENCE EVENT $i$: INDEX OF PROJECTION DATA SPACE
$j$: INDEX OF IMAGE SPACE
$k$: NUMBER OF TIMES OF MAIN ITERATIONS
$n$: NUMBER OF TIMES OF SUB ITERATIONS
$l$: SUBSET INDEX
$t$: INDEX OF LIST MODE EVENT
SUPERSCRIPT $P$: PET EVENT
SUPERSCRIPT $C$: COMPTON EVENT

FIG. 13

```
3000 SET TIME WINDOW
  ↓
3010 IS THERE PAIR OF UNPROCESSED SINGLE EVENTS IN TIME WINDOW?
  No → 3200 TO NEXT TIME WINDOW
  Yes ↓
3020 SELECT PAIR OF SINGLE EVENTS
  ↓
3030 COMBINATION OF DETECTORS
  ├─ EITHER SCATTERER DETECTORS OR ABSORBER DETECTORS →
  │    3040 DOES EACH EVENT FALL WITHIN ENERGY WINDOW OF ANNIHILATION RADIATION? (ex. 400-600 keV)
  │      No → (back)
  │      Yes → 3100 EXTRACT AS PET EVENT
  └─ SCATTERER DETECTOR AND ABSORBER DETECTOR →
       3050 DOES EACH EVENT FALL WITHIN ENERGY WINDOW OF ANNIHILATION RADIATION? (ex. 400-600 keV)
         Yes → 3100 EXTRACT AS PET EVENT
         No ↓
       3060 DOES TOTAL ENERGY FALL WITHIN ENERGY WINDOW OF ANNIHILATION RADIATION? (ex. 400-600 keV)
         Yes ↓
           3070 DOES SCATTERER DETECTOR FALL WITHIN SCATTERING ANGLE-LIMITED ENERGY WINDOW OF ANNIHILATION RADIATION? (ex. 10-120 keV)
             Yes ↓
               3080 IS THERE EVENT (TOTAL OF SCATTERER DETECTOR AND ABSORBER DETECTOR, OR SINGLY) IN ENERGY WINDOW OF ANNIHILATION RADIATION WITHIN SAME TIME WINDOW?
                 Yes → 3100 EXTRACT AS PET EVENT
                 No → 3110 EXTRACT AS ANNIHILATION RADIATION COMPTON EVENT
             No → 3090
         No → 3090
       3090 TOTAL ENERGY FALLS WITHIN ENERGY WINDOW OF SINGLE GAMMA-RAY (ex. 800-1000 keV) AND SCATTERER DETECTOR FALLS WITHIN ANGLE-LIMITED ENERGY WINDOW OF SINGLE GAMMA-RAY (ex. 10-350 keV)
         Yes → 3120 EXTRACT AS SINGLE GAMMA-RAY COMPTON EVENT
         No → (back)
```

DOUBLE-RING SYSTEM

MULTI-RING SYSTEM

DISPOSE SCATTERER DETECTOR RING INSIDE ABSORBER DETECTOR RING

DISPOSE SCATTERER DETECTOR RINGS OUTSIDE ABSORBER DETECTOR RING

SCATTERER DETECTOR RING PARTIAL TYPE

BOTH DETECTOR RINGS PARTIAL TYPE

SEMICONDUCTOR DETECTOR

MULTI-RING DETECTOR CONFIGURATION
USING SEMICONDUCTOR DETECTORS

MULTI-RING DETECTOR CONFIGURATION
USING SCINTILLATION DETECTORS

ONLY PET EVENTS

ONLY COMPTON EVENTS

CONVENTIONAL METHOD
(SIMPLE SIMULTANEOUS RECONSTRUCTION)

METHOD OF PRESENT INVENTION
(HYBRID IMAGE RECONSTRUCTION)

MEDICAL IMAGE PROCESSING DEVICE, COMPUTER PROGRAM, AND NUCLEAR MEDICINE DEVICE

TECHNICAL FIELD

The present invention relates to a medical image processing device, a computer program, and a nuclear medicine device, and more particularly to a medical image processing device, a computer program, and a nuclear medicine device that are suitably used in medical equipment and can combine PET events and Compton events which have different properties to enable efficient, stable image reconstruction with improved image quality.

BACKGROUND ART

PET (Positron Emission Tomograph is a nuclear medicine technique for administering a drug labeled with a positron-emitting radionuclide into a living body and imaging the distribution thereof. A pair of annihilation radiations emitted in approximately 180° opposite directions from the administered drug are measured as a PET event by coincidence of detectors (PET ring) arranged to surround the area to be measured. A PET event can limit the position of the radiation source to be on a line (LOR: Line of Response) connecting the two detectors. The distribution of the drug in the living body can be estimated from a plurality of PET events. In so doing, the probability of successful coincidence of produced annihilation radiations is 5% to 10% at most, and 1% or less in some places. Meanwhile, there are about 10 times as many detection events where only one of a pair of annihilation radiations is detected without coincidence. There are many positron-emitting radionuclides that disintegrate into something other than positrons in the process of decay, and some emit single gamma-rays aside from annihilation radiations. If such a nuclide is used in PET, single gamma-rays cause only noise.

The applicant has thus proposed a method for improving the sensitivity of the device by inserting a scatterer detector ring into a PET ring to detect halves of pairs of annihilation radiations and single gamma-rays as Compton events using the principle of a Compton camera. A Compton event can limit the position of the radiation source on a conical surface (Compton cone) using energy information and detection position information.

The applicant has further proposed, in Patent Literature 1, a method for compensating a drop in image quality due to a problem of imperfect projection data of a partial ring PET targeted for PET nuclides by detecting single gamma-rays using the principle of a Compton camera.

Moreover, Patent Literature 2 discloses a nuclear medicine diagnostic device that produces a final image for diagnosis by using a first image reconstructed from a result of detection of a pair of radiations (pair of photons) emitted from a measurement target and a second image reconstructed from a result of detection of one or more photons obtained from a single radiation emitted from the measurement target on the basis of Compton scattering.

Furthermore, Non-Patent Literature 1 describes three methods directed to measurement of a PET nuclide as image reconstruction techniques combining Compton events and PET events. Specifically, the three methods are: (1) a method for simply combining Compton events and PET events into one system model; (2) a technique for initially performing OSEM (Ordered Subset Expectation Maximization)-based image reconstruction using only Compton events, and then performing OSEM-based image reconstruction using only PET events with the obtained image as an initial image; and (3) a Bayesian method using an image reconstructed using only Compton events as prior information.

CITATION LIST

Patent Literature

Patent Literature 1: Japanese Patent Application Laid-Open No. 2018-136152
Patent Literature 2: Japanese Patent Application Laid-Open No. 2014-52353

Non-Patent Literature

Non-Patent Literature 1: G. Chinn, A. M. K. Foudray, and C. S. Levin, A method to include single photon events in image reconstruction for a 1 mm resolution PET system built with advanced 3-D positioning detectors, 2006 IEEE Nuclear Science Symposium Conference Record, pp. 1740-1745, 2006.

SUMMARY OF INVENTION

Technical Problem

However, the technology described in Patent Literature 1 only discloses that the measurable projection directions are sufficient, and not a specific technique for performing image reconstruction by combining Compton events of single gamma-rays measured by the principle of a Compton camera with PET events.

Patent Literature 2 includes no description of "weighting and adding" the first image produced on the basis of PET events and the second image produced on the basis of Compton events.

Of the technologies described in Non-Patent Literature 1, the method (1) for simply combining Compton events and PET events into a single system model does not always make use of the full performance available, since the respective events have significantly different properties and thus substantial artifacts occur depending on the device configuration. The other methods (2) and (3) are approaches to first reconstruct one image and then use the information for the reconstruction of the other, and it is difficult to say that the advantages of each event are not fully utilized.

As described above, PET events and Compton events occur from the same radioactivity distribution but have significantly different properties. No technique has been developed for efficiently combining information about both events for image reconstruction.

The present invention has been achieved to solve the foregoing conventional problems, and a first object thereof is to provide a medical image processing device and a computer program capable of combining PET events and Compton events which have different properties to enable efficient, stable image reconstruction with improved image quality.

A second object of the present invention is to provide a nuclear medicine device using the foregoing medical image processing device.

Solution to Problem

The present invention has been achieved to solve the foregoing problems, and achieves the first object by the provision of a medical image processing device for reconstructing an image by iterative approximation using a PET event where a coincidence signal of a pair of annihilation radiations is obtained and a Compton event obtained by Compton scattering, the medical image processing device including: a PET event updated image production unit configured to produce a PET event updated image by updating a current image using a PET event; a Compton event updated image production unit configured to produce a Compton event updated image by updating the current image using a Compton event; an addition unit configured to weight and add the PET event updated image and the Compton event updated image produced independently of each other; an update unit configured to update the current image using an image obtained by the addition unit; and an iteration unit configured to iterate processing of the PET event updated image production unit, the Compton event updated image production unit, the addition unit, and the update unit.

Here, at least either the PET event updated image production an it or the Compton event updated image production unit can set a number of subsets as an update parameter. Moreover, at least either the PET event updated image production unit or the Compton event updated image production unit can make a sub iteration of image update using the subsets.

Moreover, the number of subsets that is the update parameter, a number of times of sub iterations, and timing of weighted addition can be set for the PET event and the Compton event independently.

Moreover, the Compton event can include an annihilation radiation Compton event and a single gamma-ray Compton event. Moreover, the PET event can include a PET event between absorber detectors, a PET event between a scatterer detector and an absorber detector, and a PET event between scatterer detectors.

Moreover, the PET event can include a PET event with time of flight information and a PET event without time of flight information.

Moreover, if the nuclide is a 3-gamma-ray nuclide, a 3-gamma event can be further included.

The present invention also provides a computer program for causing a computer to implement the medical image processing device. This computer program can be recorded on a non-transitory computer-readable recording medium.

The present invention also solves the foregoing second problem by the provision of a nuclear medicine device that includes a PET-Compton simultaneous measurement device including scatterer detectors and absorber detectors, and the medical image processing device.

Here, at least either the scatterer detectors or the absorber detectors can be arranged in a ring shape, a partial ring shape, or an opposed shape.

Moreover, the scatterer detectors can be arranged in a multi-ring shape.

Moreover, the scatterer detectors can be located inside a measurement field of view of the absorber detectors.

Moreover, the scatterer detectors can be located outside a measurement field of view of the absorber detectors.

Moreover, a measurement field of view of the Compton event can be made greater than a measurement field of view of the PET event.

Moreover, a pixel size of the measurement field of view of the Compton event can be made greater than that of the measurement field of view including the PET event.

The present invention also achieves the second object by the provision of a nuclear medicine device including: a PET-Compton event simultaneous measurement device configured to simultaneously measure a PET event and a Compton event; a single event collection device configured to collect single events from output of the PET-Compton event simultaneous measurement device; a software coincidence device configured to collect PET events from output of the PET-Compton event simultaneous measurement device; a hybrid image reconstruction device configured to reconstruct a hybrid image of the PET events and the Compton events on the basis of output of the single event collection device and the software coincidence device, the hybrid image reconstruction device including the medical image processing device; a control device configured to control the PET-Compton event simultaneous measurement device, the single event collection device, the software coincidence device, and the hybrid image reconstruction device; and a display and operation controller.

According to the present invention, there can also be a claim for a medical image processing method for reconstructing an image by iterative approximation using a PET event where a coincidence signal of a pair of annihilation radiations is obtained and a Compton event obtained by Compton scattering, the medical image processing method including: a PET event updated image production processing for producing a PET event updated image by updating a current image using the PET event; a Compton event updated image production processing for producing a Compton event updated image by updating the current image using the Compton event; an addition processing for weighting and adding the PET event updated image and the Compton event updated image produced independently of each other; and an update processing for updating the current image using an image obtained by the addition processing, wherein the PET event updated image production processing, the Compton event updated image production processing, the addition processing, and the update processing are iterated.

Advantageous Effect of Invention

According to the present invention, the sensitivity and image quality of PET nuclide distribution measurement can be improved by efficiently combining PET events and Compton events. In particular, in measuring a nuclide that emits single gamma-rays aside from positrons, an even greater effect of improving sensitivity and image quality can be obtained by efficiently using the single gamma-rays that have been unable to be effectively used by conventional devices or methods.

BRIEF DESCRIPTION OF DRAWINGS

FIG. 3 is a diagram showing equations for implementing the technique of FIG. 2.

FIG. 6 is a diagram showing equations Los implementing the technique of FIG. 5.

FIG. 13 is a flowchart of an algorithm for extracting a PET event, an annihilation radiation Compton event, and a single gamma-ray Compton event on the basis of time information and energy information about single events measured by scatterer detectors and absorber detectors used in the same device.

DESCRIPTION OF EMBODIMENTS

An embodiment of the present invention will be described in detail below with reference to the drawings. Note that the present invention is riot limited to the description of the following embodiment or practical examples. The components of the embodiment and practical examples described below include ones easily conceivable by those skilled in the art, substantially identical ones, and ones within the so-called range of equivalency. The components of the embodiment and practical examples described below may be combined as appropriate, or selected and used as appropriate.

The embodiment of the present invention is a hybrid image reconstruction technique as an iterative approximation image reconstruction method, and includes production of updated images using a PET event and a Compton event separately in each iteration, and combination of the two updated images by weighted averaging to obtain an updated image. FIGS. 1 to 10 show the concept of this technique.

Figure 1:
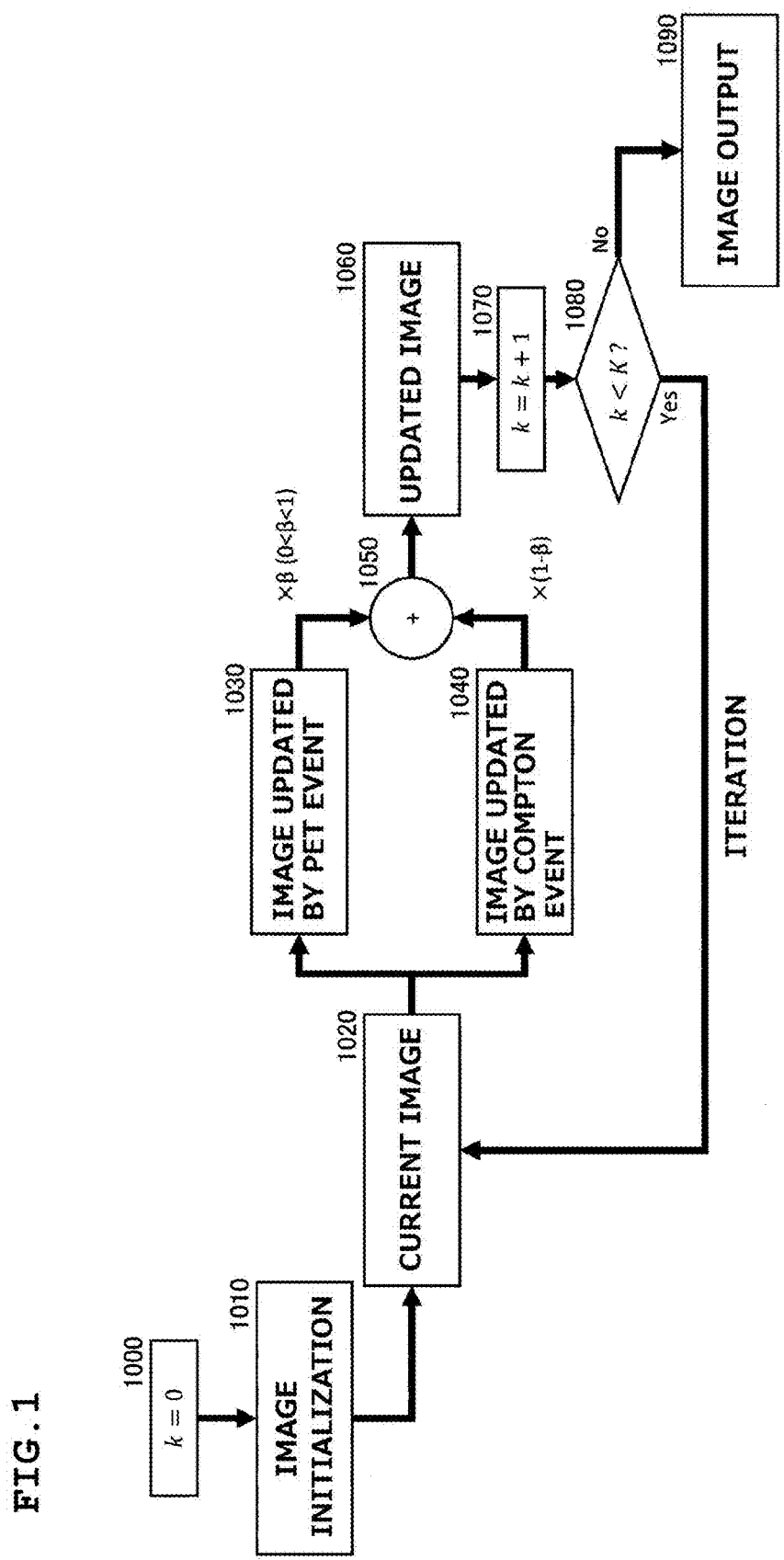
FIG. 1 is a diagram showing a first technique for hybrid image reconstruction according to an embodiment of the present invention.

According to a first technique for hybrid image reconstruction according to the embodiment of the present invention, as shown in FIG. 1, a count value k of an iteration counter is reset to zero in step 1000. A current image 1020 obtained by image initialization in step 1010 is updated by a PET event to obtain a PET event updated image in step 1030, and updated by a Compton event to obtain a Compton event updated image in step 1040. An adder 1050 performs weighted addition by multiplication of predetermined factors $\beta$ ($0<\beta<1$) and ($1-\beta$) to obtain an updated image 1060. In step 1070, the count value k of the counter is counted up by one. In step 1080, whether the count value k has reached a setting value K is determined. If the count value k is less than the setting value K, the processing returns to step 1020 to repeat the update 1030 by a PET event and the update 1040 by a Compton event independently of each other. If the count value k of The counter has reached the setting value K, the processing proceeds to step 1090 to output the image.

Figure 2:
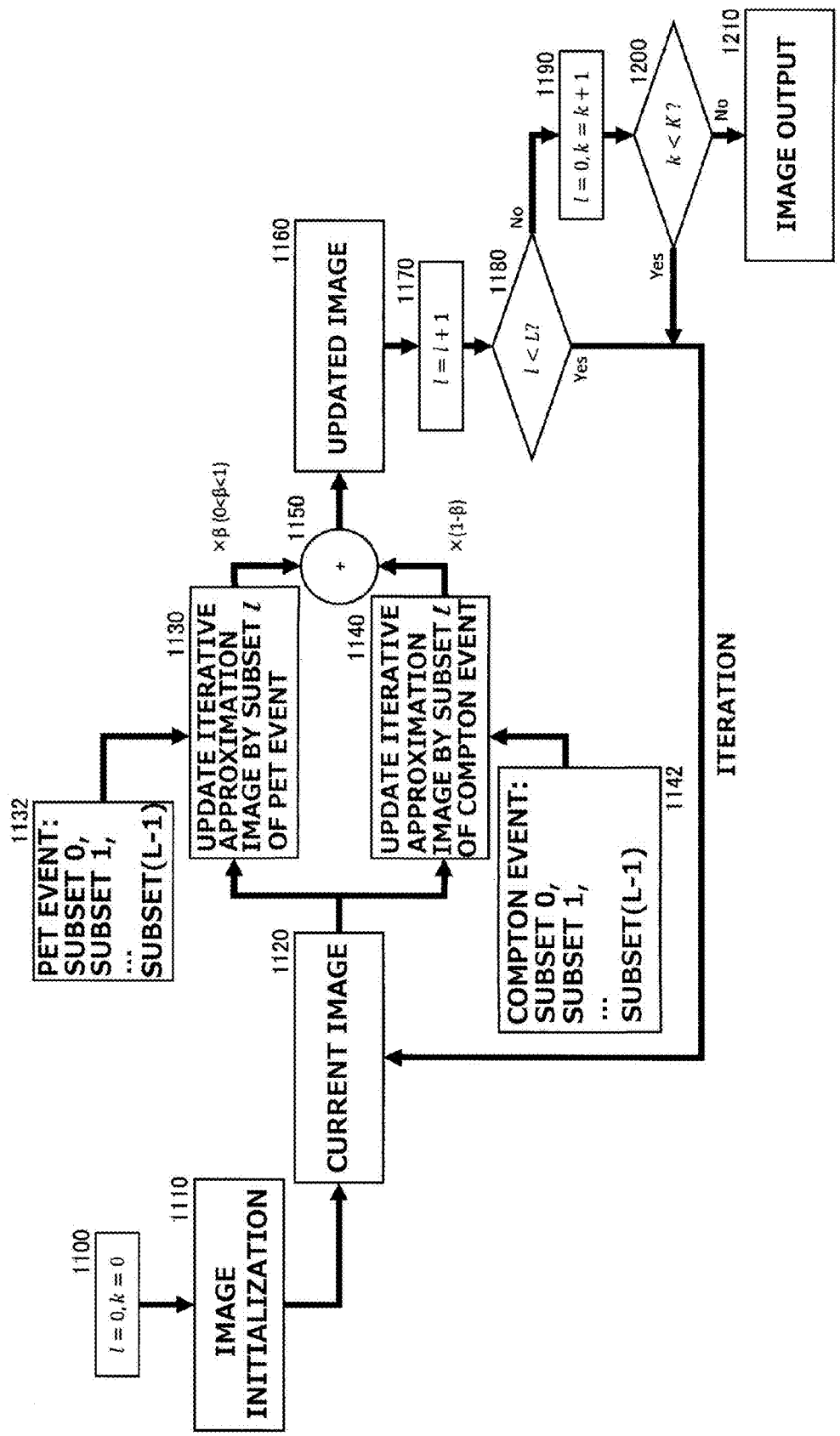
FIG. 2 is a diagram showing a second technique for the hybrid image reconstruction according to the embodiment of the present invention.

In a second technique using subsets for the hybrid image reconstruction according to the embodiment of the present invention, as shown in FIG. 2, a count value l of a subset counter and the count value k of the iteration counter are reset to zero in step 1100. Using PET event subsets 1132 and Compton event subsets 1142, a current image 1120 obtained by image initialization in step 1110 is updated into iterative approximation images by respective predetermined subsets 1 in steps 1130 and 1140. An adder 1150 then performs weighted addition to obtain an updated image 1160. In step 1170, the count value I of the subset counter is then counted up. The update of the iterative approximation image using the PET event subsets and the update of the iterative approximation image using the Compton event subsets are repeated until the count value l reaches a setting value L in step 1180. If the count value l of the subset counter is determined to have reached the setting value L in step 1180, the processing proceeds to step 1190 to reset the count value l of the subset counter to zero and count up the count value k of the iteration counter. Steps 1200 to 1190 are then repeated until the count value k of the iteration counter is determined to have reached the setting value K in step 1200. If the count value k of the iteration counter is determined to have reached the setting value K in step 1200, the image is outputted in step 1210.

FIG. 3 shows equations for an implementation example corresponding to FIG. 2. Using PET events and Compton events divided into respective L subsets, images updated using the respective events are produced, weighted using a predetermined factor (parameter) β, and then added for image update. Here, images which have the same dimensions and quantitative properties can be added since variations in the sensitivity of the pixels are corrected with respect to each event type before the addition into an overall sensitivity image.

Figure 4:
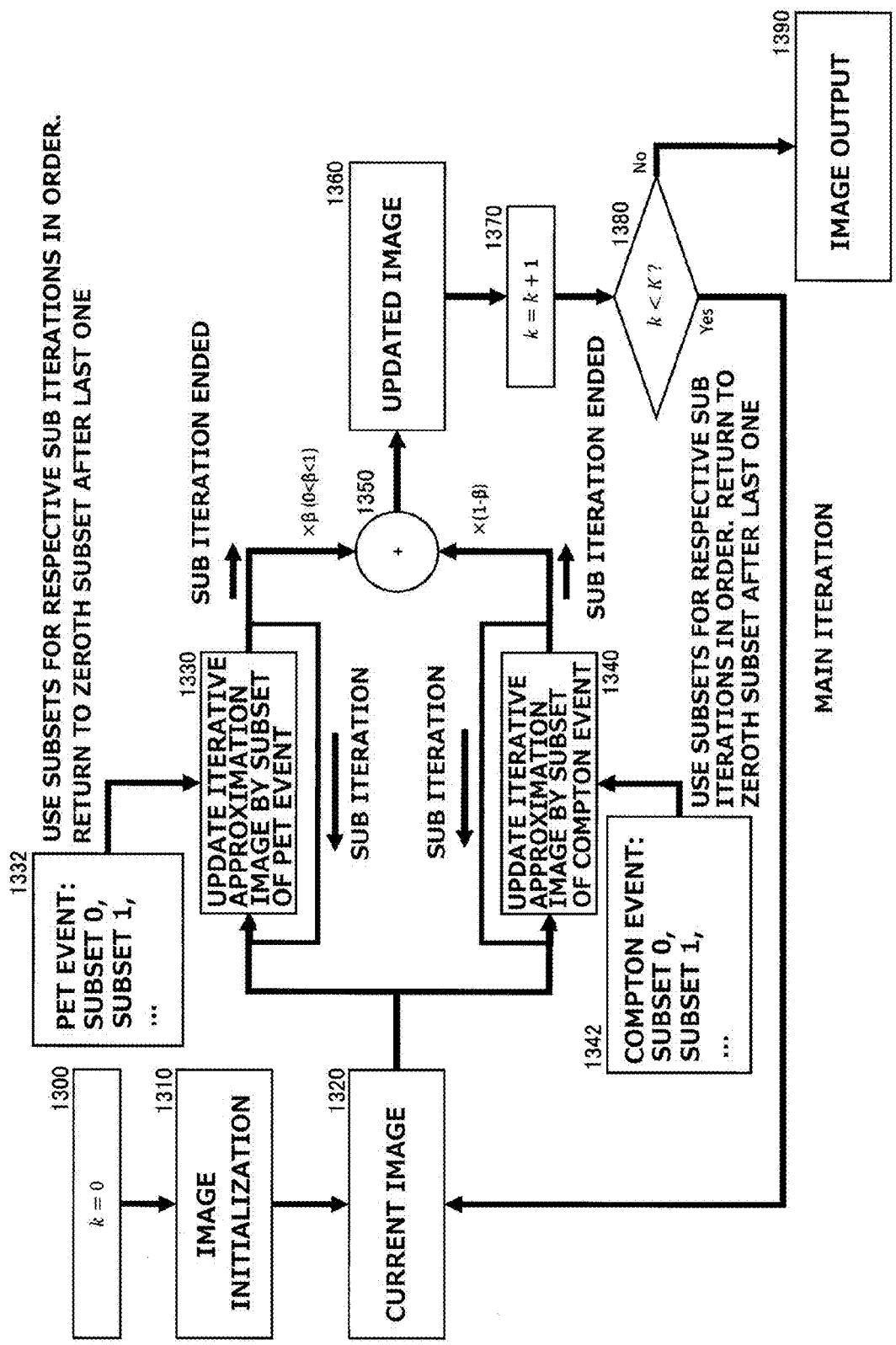
FIG. 4 is a diagram showing a third technique for the hybrid image reconstruction according to the embodiment of the present invention.

Next, a third technique for making a sub iteration multiple times in the hybrid image reconstruction according to the embodiment of the present invention will be described with reference to FIG. 4.

In this technique, the count value k of the counter is reset in step 1300. An image is initialized in step 1310 to obtain a current image in step 1320. The processing then proceeds to step 1330, where a sub iteration is made to update an iterative approximation image by a subset of the PET event, using subsets 1332 of the PET event. The subsets are used for respective sub iterations in order, and return to the zeroth subset after the last one.

Update 1340 of an iterative approximation image by a subset of the Compton event is similarly performed to update the iterative approximation image by a subset, using subsets 1342 of the Compton event. The subsets are used for respective sub iterations in order, and return to the zeroth subset after the last one.

When both the sub iterations for the update 1330 of an iterative approximation image using the subsets of the PET event and the sub iterations for the update 1340 of an iterative approximation image using the subsets of the Compton event end, an adder 1350 performs weighted addition by multiplication of predetermined factors β (0<β<1) and (1−β) to obtain an updated image 1360.

The processing then proceeds to step 1370 to count up the count value k of the counter by one. In step 1380, whether the count value k is less than the setting value K is determined. If the determination in step 1380 is positive, the processing returns to step 1320 to repeat the main iteration.

If the count value k is determined to have reached the setting value K in step 1380, the processing proceeds to step 1390 to output the image.

Next, a fourth technique for setting the numbers of times of sub iterations with a PET event and a Compton event separately in the hybrid image reconstruction according to the embodiment of the present invention will be described with reference to FIG. 5.

In this technique, count values k, $l_p$, and $l_c$ of counters are each initially reset to zero in step 1400.

The processing then proceeds to step 1410, where an image is initialized to obtain a current image 1420.

The processing then proceeds to step 1430. The update 1430 of an iterative approximate image by a PET event uses subsets 1432 of the PET event. The count value $l_p$ of the counter is counted Up in step 1440, and the sub iteration is repeated until the count value $l_p$ reaches a set number of times $N_p$.

Meanwhile, the update 1450 of an iterative approximate image by a Compton event uses subsets 1452 of the Compton event. The count value $l_c$ of the counter is counted up in step 1460, and the sub iteration is repeated until the count value $l_c$ reaches a predetermined number of times $L_c$.

When the update of the iterative approximation image based on the count value $l_p$ of the PET event subset counter and The update of the iterative approximation image based on the count value $l_c$ of the Compton event subset counter end, an adder 1470 performs weighted addition to obtain an updated image 1480. The processing then proceeds to step 1490 to count up the count value k of the counter by one. In step 1500, whether the count value k has reached the setting value K is determined. If the count value k has not reached the predetermined value, the processing returns to step 1420 to repeat the main iteration.

If, in step 1500, the count value k of the counter is determined to have reached the setting value K, the processing proceeds to step 1510 to output the image.

Figure 5:
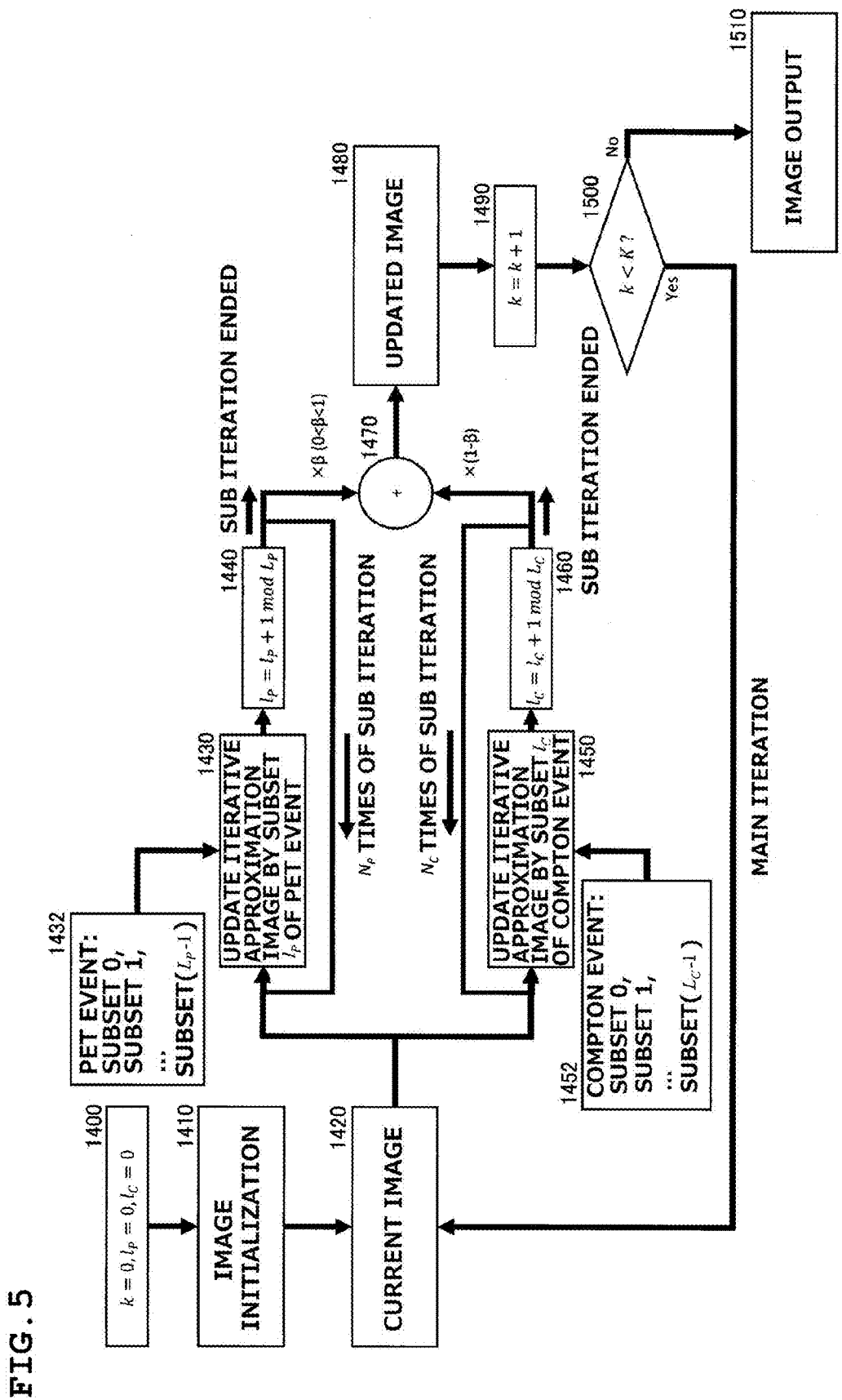
FIG. 5 is a diagram showing a fourth technique for the hybrid image reconstruction according to the embodiment of the present invention.

FIG. 6 shows equations for an implementation example corresponding to FIG. 5. In each main iteration, a sub iteration using the PET event is performed $N_P$ times and a sub iteration using the Compton event is performed $N_C$ times. The respective images after the end of the sub iterations are weighted using the predetermined factor (parameter) β and added for image update at the end of the main iteration. As with the equations in FIG. 3, images which have the same dimensions and quantitative properties can be added since variations in the sensitivity of the pixels are corrected with respect to each event type before the addition into an overall sensitivity image.

Figure 7:
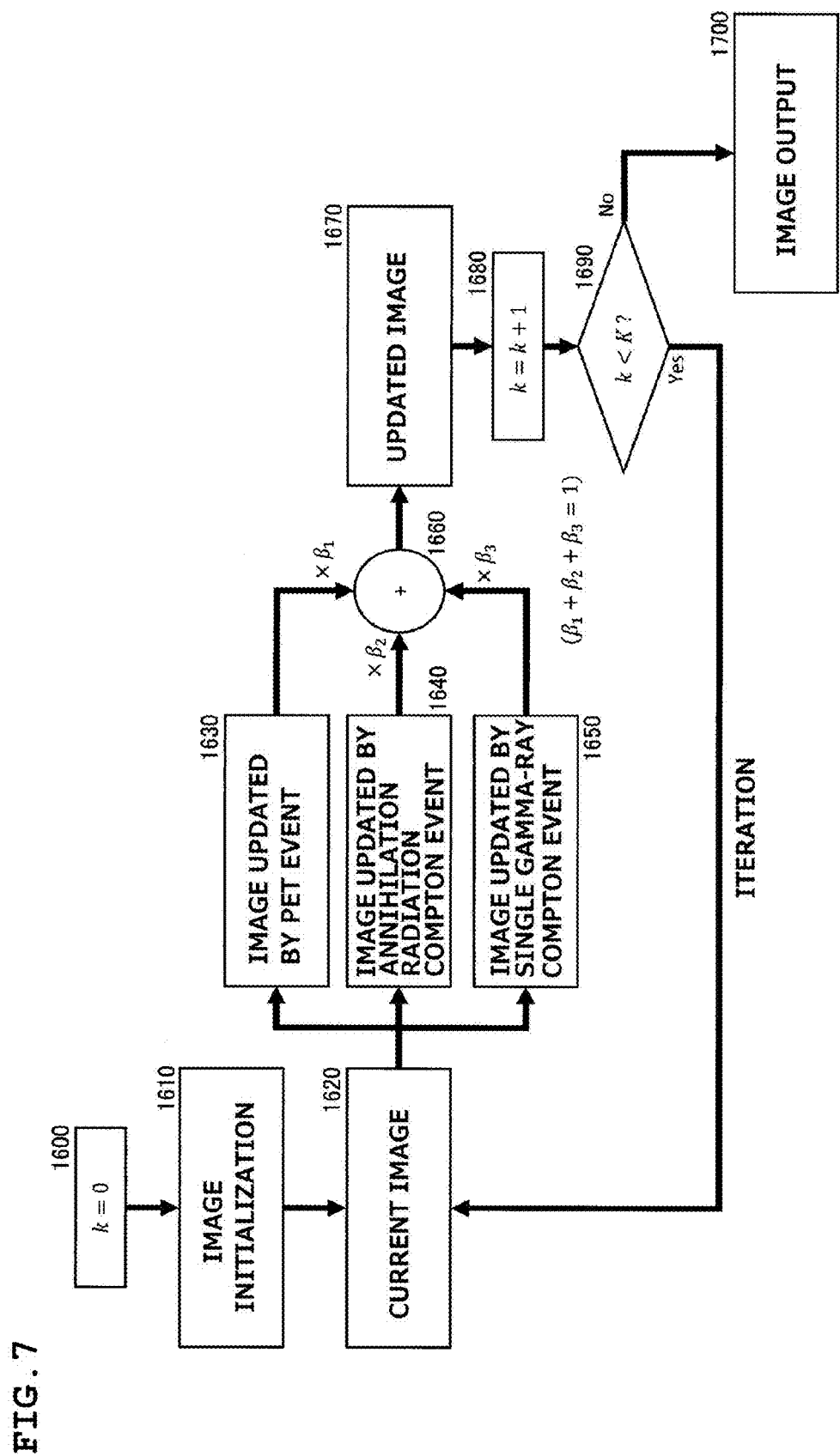
FIG. 7 is a diagram showing a fifth technique for the hybrid image reconstruction according to the embodiment of the present invention.

Next, a fifth technique for the hybrid image reconstruction according to the embodiment of the present invention will be described. with reference to FIG. 7.

In this technique, the count value k of the counter is initially reset to zero in step 1600. In step 1610, an image is initialized. In step 1620, a current image is obtained.

Next, the image is updated by a PET event in step 1630, updated by an annihilation radiation Compton event in step 1640, and updated by a single gamma-ray event in step 1650.

The processing then proceeds to an adder 1660, which weights and adds respective predetermined factors $β_1$, $β_2$, and $β_3$ ($β_1+β_2+β_3=1$) to obtain an updated image 1670.

Next, in step 1680, the count value k of the counter is counted up by one. In step 1690, whether the count value k of the counter is less than the setting value K is determined. If the determination is positive, the processing proceeds to step 1620 to repeat the image update in steps 1630, 1640, and 1650.

If the determination in step 1690 is negative, the processing proceeds to step 1700 to output the image.

Figure 8:
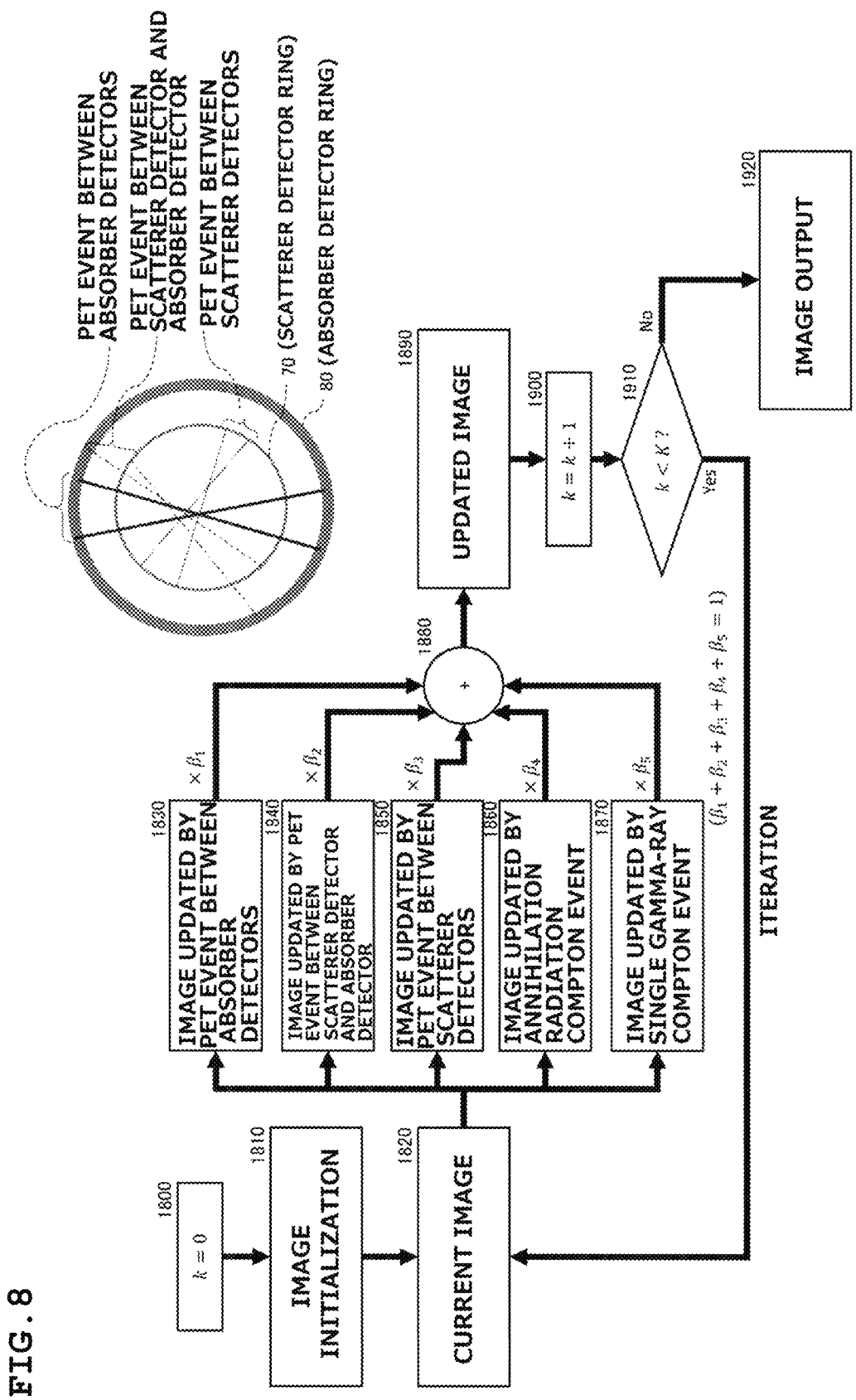
FIG. 8 is a diagram showing a sixth technique for the hybrid image reconstruction according to the embodiment of the present invention.

Next, a sixth technique for the hybrid image reconstruction according to the embodiment of the present invention will be described with reference to FIG. 8. According to this technique, the count value k of the counter is reset to zero in step 1800. In step 1810, an image is initialized. In step 1820, a current image is obtained. The image is then updated by a PET event between absorber detectors of an absorber detector ring 80 in step 1830, updated by a PET event between a scatterer detector of a scatterer detector ring 70 and an absorber detector in step 1840, updated by a PET event between scatterer detectors of the scatterer detector ring 70 in step 1850, updated by an annihilation radiation Compton event in step 1860, and updated by a single gamma-ray Compton event in step 1870.

After the image update, an adder 1880 performs weighted addition using factors $\beta_1$, $\beta_2$, $\beta_3$, $\beta_4$, and $\beta_5$ ($\beta_1+\beta_2+\beta_3+\beta_4+\beta_5=1$) to obtain an updated image 1890. The processing then proceeds to step 1900 to count up the count value k of the counter by one. In step 1910, whether the count value k of the counter is less than, the setting value K is determined. If the determination is positive, the processing proceeds to step 1820 to repeat the image update.

On the other hand, if the determination in step 1910 is negative, the image is outputted in step 1920.

Figure 9:
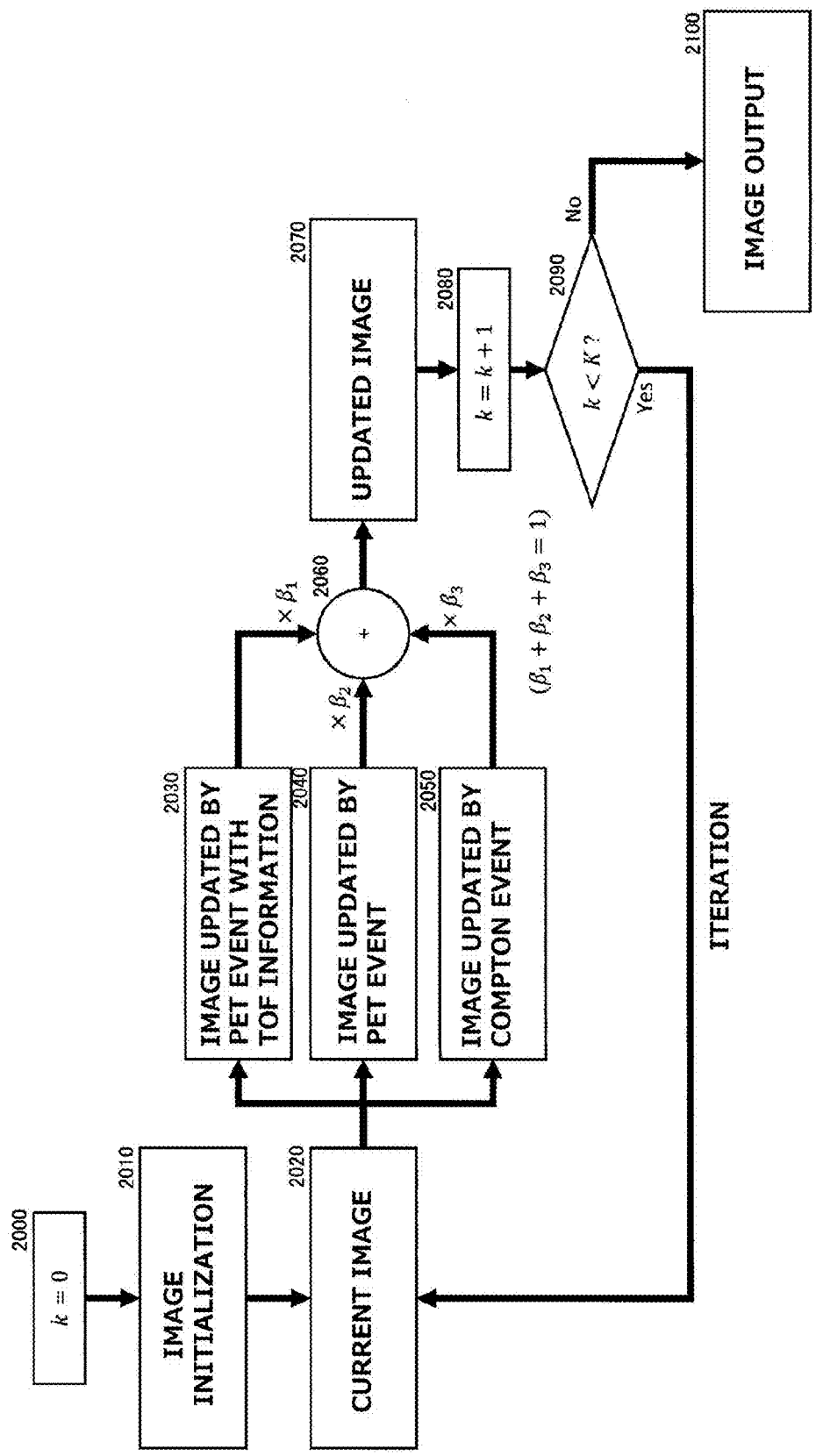
FIG. 9 is a diagram showing a seventh technique for the hybrid image reconstruction according to the embodiment of the present invention.

Next, a seventh technique for the hybrid image reconstruction according to the embodiment of the present invention will be described with reference to FIG. 9.

In this technique, the count value k of the counter is reset to zero in step 2000. In step 2010, an image is initialized. In step 2020, a current image is obtained.

Next, an image is updated by a PET event with time of flight (TOF) information in step 2030, updated by a normal PET event without TOF information in step 2040, and updated by a Compton event in step 2050.

After the end of the respective independent image updates, an adder 2060 weights and adds the respective outputs using factors $\beta_1$, $\beta_2$, and $\beta_3$ ($\beta_1+\beta_2+\beta_3=1$) to obtain an updated image of step 2070.

The processing then proceeds to step 2080 to count up the count value k of the counter by one. In step 2090, whether the count value k of the counter is less than the setting value K is determined. If the determination is positive, the processing returns to step 2020 to repeat the image update in steps 2030, 2040, and 2050.

On the other hand, if the determination in step 2090 is negative, the processing proceeds to step 2100 to output the image.

Figure 10:
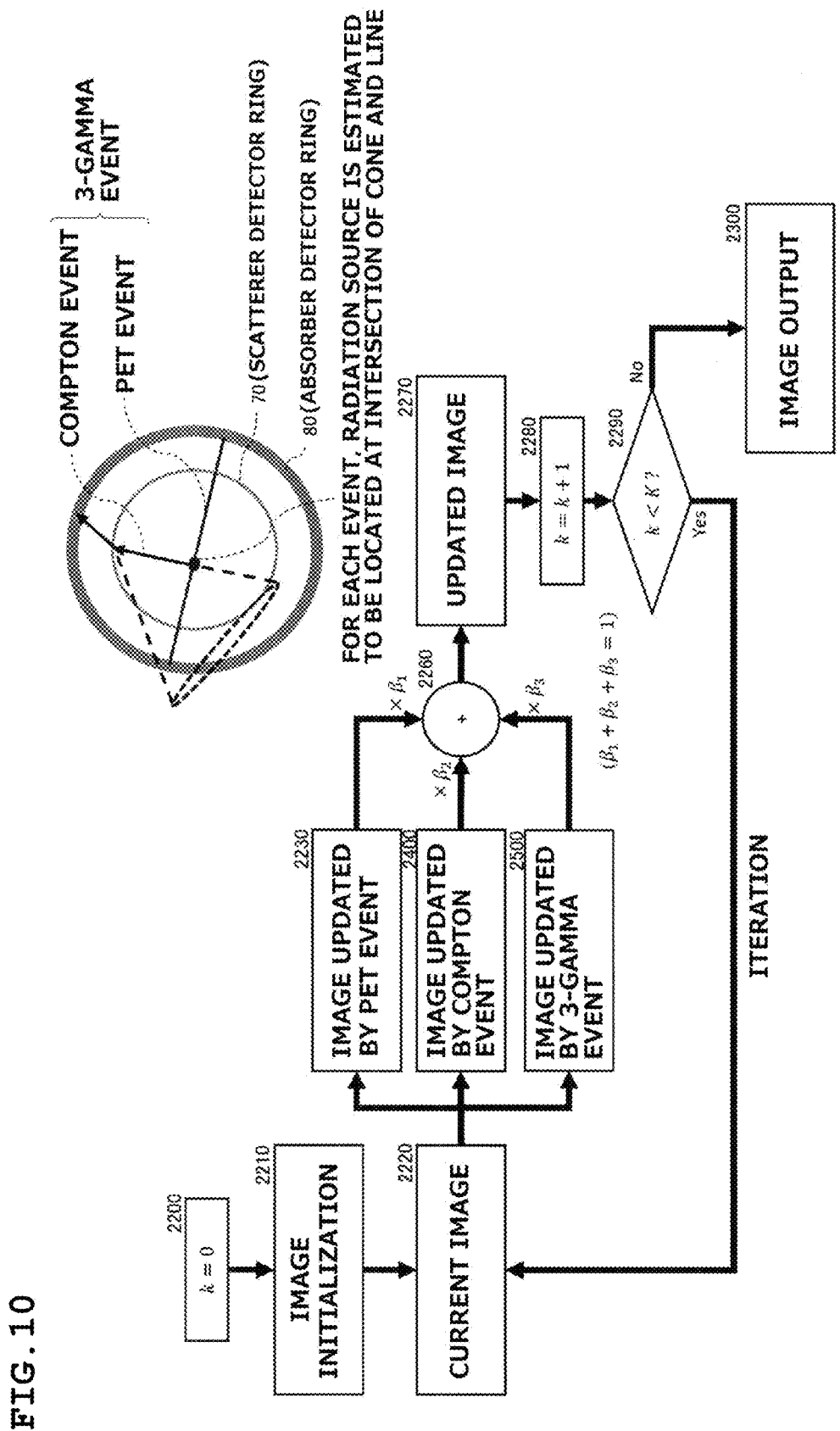
FIG. 10 is a diagram showing an eighth technique for the same.

Next, an eighth technique for the hybrid image reconstruction according to the embodiment of the present invention will be described with reference to FIG. 10.

In this eighth technique, the count value k of the counter is reset to zero in step 2200. After image initialization in step 2210, a current image is obtained in step 2220.

Next, the image is updated by a PET event in step 2230, updated by a Compton event in step 2400, and updated by a 3-gamma event in step 2500. After the image update, an adder 2260 performs weighted addition using factors $\beta_1$, $\beta_2$, and ($\beta_3+\beta_2\beta_3=1$) to obtain an updated image 2270.

Next, in step 2280, the count value k of the counter is counted up by one. The processing then proceeds to step 2290, and whether the count value k of the counter is less than the setting value K is determined. If the determination is positive, the processing returns to step 2220.

On the other hand, if the determination in step 2290 is negative, the processing proceeds to step 2300 to output the image.

While all of the foregoing techniques use the number of times of iterations as the condition to end the iteration. However, the condition to end iteration is not limited thereto.

Figure 11:
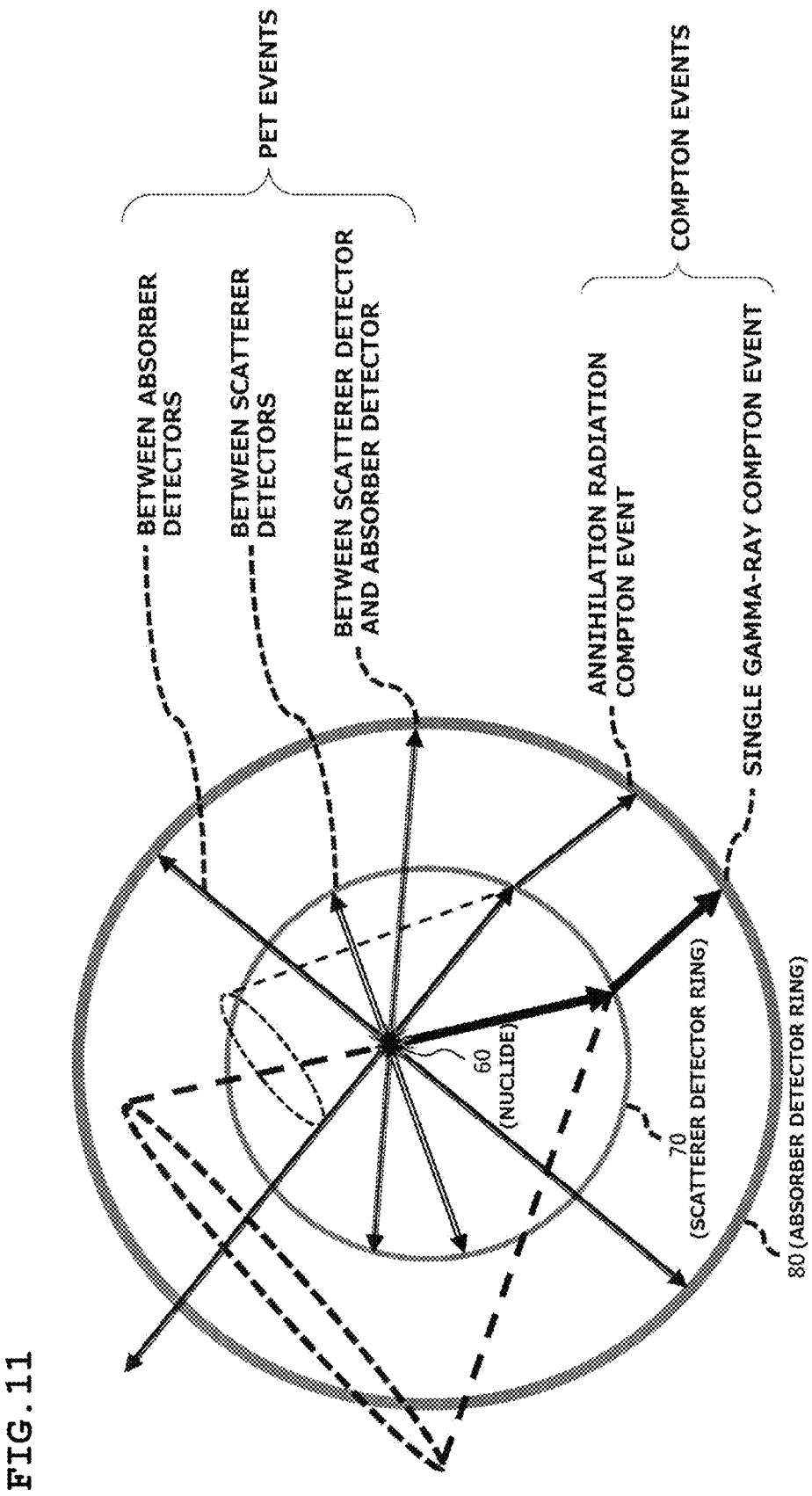
FIG. 11 is a diagram showing classification of measurement events in a PET-Compton event simultaneous measurement device used in the embodiment of the present invention.

The techniques according to the embodiment of the present invention can correct properties specific to respective events separately like sensitivity correction. This enables stable image update since the information to be combined has the same dimensions and quantitative properties. Moreover, as shown in FIG. 2, subsets can easily be used for speedup. Image reconstruction can be performed using two events of different properties effectively by simply combining the updated images using the subsets of the respective events. As shown in FIG. 11, the Compton event to be used here is directed to both where either one of a pair of annihilation radiations emitted from a nuclide (here, PET nuclide) 60 is detected (annihilation radiation Compton event) and where a single gamma-ray occurring from a nuclide that emits single gamma-rays beside positrons is detected (single gamma-ray Compton event). In using the latter nuclide, as shown in FIG. 7, the updated image can be a weighted average of three updated images produced using a PET event, an annihilation radiation Compton event, and a single gamma-ray Compton event.

Moreover, if scatterer detectors and absorber detectors differ greatly in spatial resolution, PET event updated images can be produced for respective detector combinations and averaged with weights.

Since convergence properties vary depending on the event type, the final convergence properties can be improved by devising the numbers of subsets and the timing to combine the updated images. For example, after several iterations for obtaining a Compton event updated image, the Compton event updated image may be combined with a PET event image obtained by one iteration.

Furthermore, the total value of the weighting factors is not limited to 1. For example, the factors can be changed to make the total value smaller than 1 depending on the iterations, so that both improvement of the convergence properties by the use of the subsets and improvement of the image quality due to reduced noise propagation are achieved.

Figure 12:
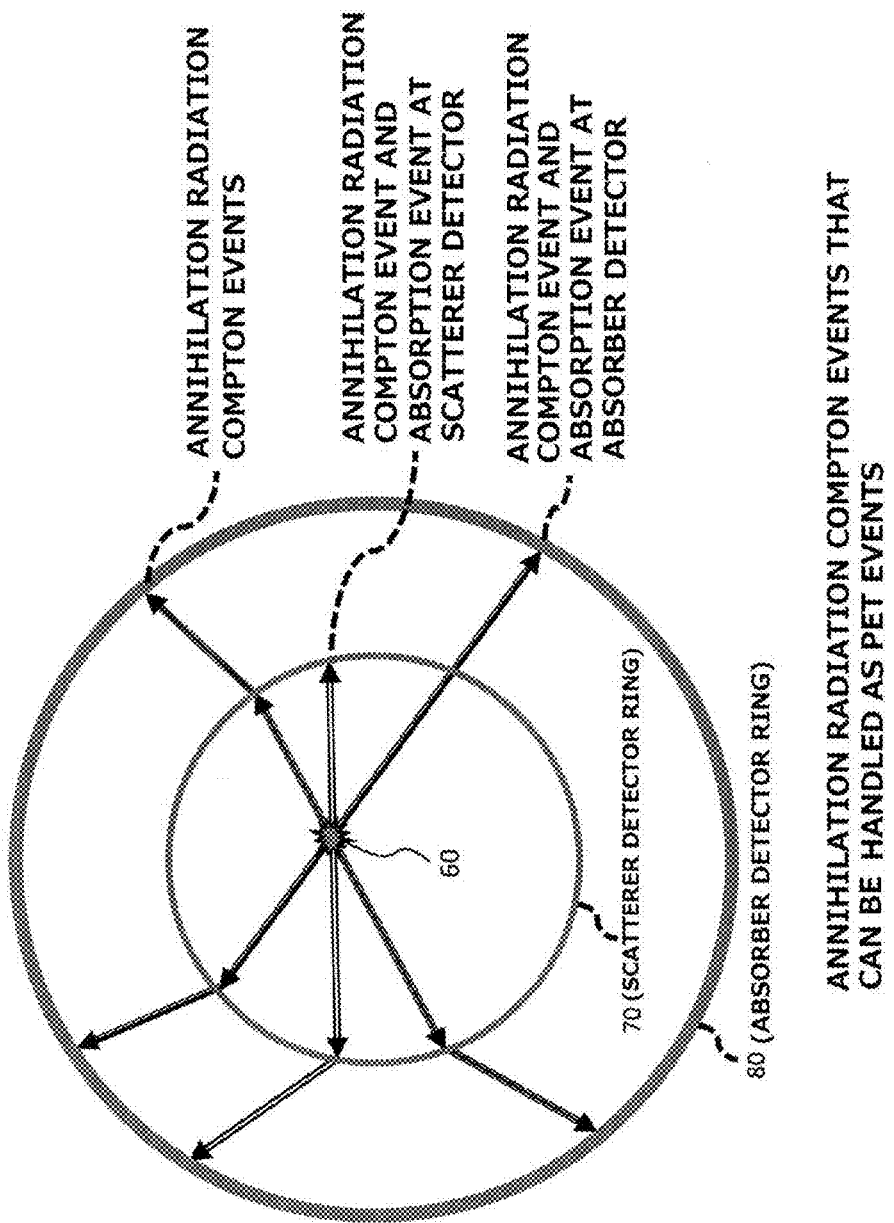
FIG. 12 is a diagram showing classification of annihilation radiation Compton events that can be handled as PET events used in the same device.

FIG. 11 shows the classification of PET events and Compton events in measuring a nuclide 60 emitting single gamma rays in addition positrons using a double-ring device. Since PET events can be linearly identified compared to Compton events, an annihilation radiation Compton event falling within the same time window as another annihilation radiation Compton event or an absorption event as in FIG. 12 is desirably handled as a PET event. In view of this, PET events and Compton events can be classified using energy information and time information. FIG. 13 shows the flowchart thereof.

In the procedure shown in FIG. 13, a time window is initially set in step 3000. Next, in step 3010, whether there is a pair of unprocessed single events in the time window is determined.

If the determination is positive, the processing proceeds to step 3020 to select the pair of single events.

Next, in step 3030, the combination of the detectors is determined.

If the detectors are either scatterer detectors or absorber detectors, the processing proceeds to step 3040 to determine whether each event falls within the energy window of annihilation radiation (for example, 400 to 600 keV). If the determination is negative, the processing returns to step 3010.

On the other hand, if the detectors are a combination of a scatterer detector and an absorber detector, the processing proceeds to step 3050 to determine whether each event falls within the energy window of annihilation radiation (for example, 400 to 600 keV). If the determination in step 3050 is negative, the processing proceeds to step 3060 to determine whether the total energy falls within the energy window of annihilation radiation (for example, 400 to 600 keV).

If the determination in step 3060 is positive, the processing proceeds to step 3070 to determine whether the scatterer detector falls within the scattering angle-limited energy window of annihilation radiation (for example, 10 to 120 keV). If the determination is positive, the processing proceeds to step 3080 to determine whether there is an event (total of a scatterer detector and an absorber detector, or singly) in the energy window of annihilation radiation within the same time window.

On the other hand, if the determination in step 3060 or 3070 is negative, the processing proceeds to step 3090 to determine whether the total energy falls within the energy window of a single gamma ray (for example, 800 to 1000 keV) and the scatterer detector falls within the angle-limited energy window of a single gamma-ray (for example, 10 to 350 keV).

If the determination in step 3090 is positive, the processing proceeds to step 3120 to extract the events as a single gamma-ray Compton event. If the determination is negative, the processing returns to step 3010.

If the determination in the foregoing step 3040, 3050, or 3080 is positive, the processing proceeds to step 3100 to extract the events as a PET event.

If the determination in step 3080 is negative, the processing proceeds to step 3110 to extract the events as an annihilation radiation Compton event.

On the other hand, if the determination in step 3010 is negative, then in step 3200, the processing proceeds to the next time window.

High quality images can be stably reconstructed by applying the hybrid image reconstruction techniques to the respective extracted events.

Figure 14A:
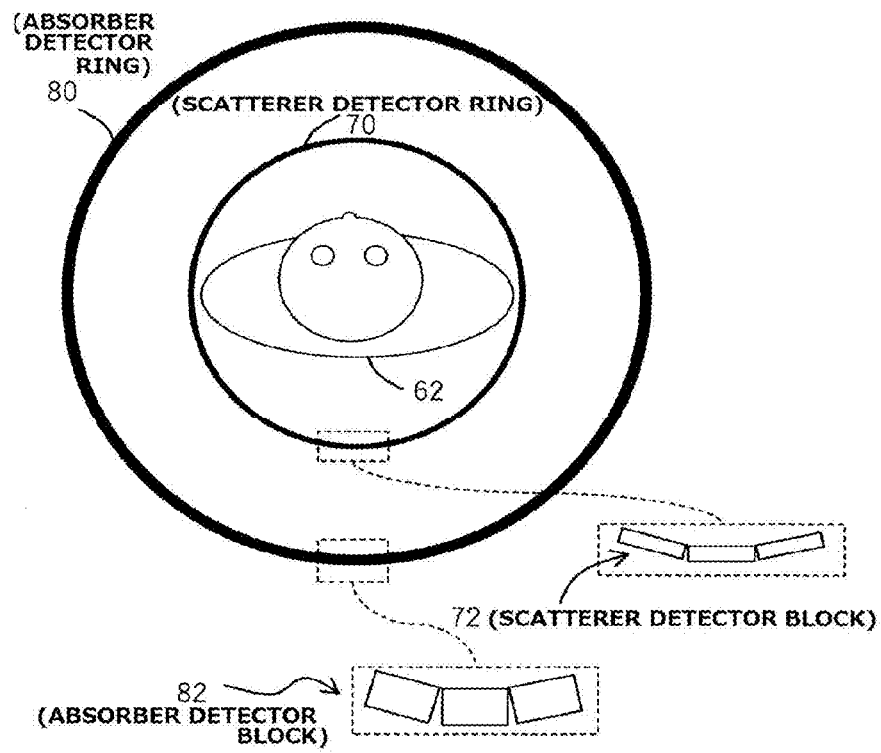
FIG. 14A is a cross-sectional view showing an example of a double-ring detector layout for carrying out the present invention.
Figure 14B:
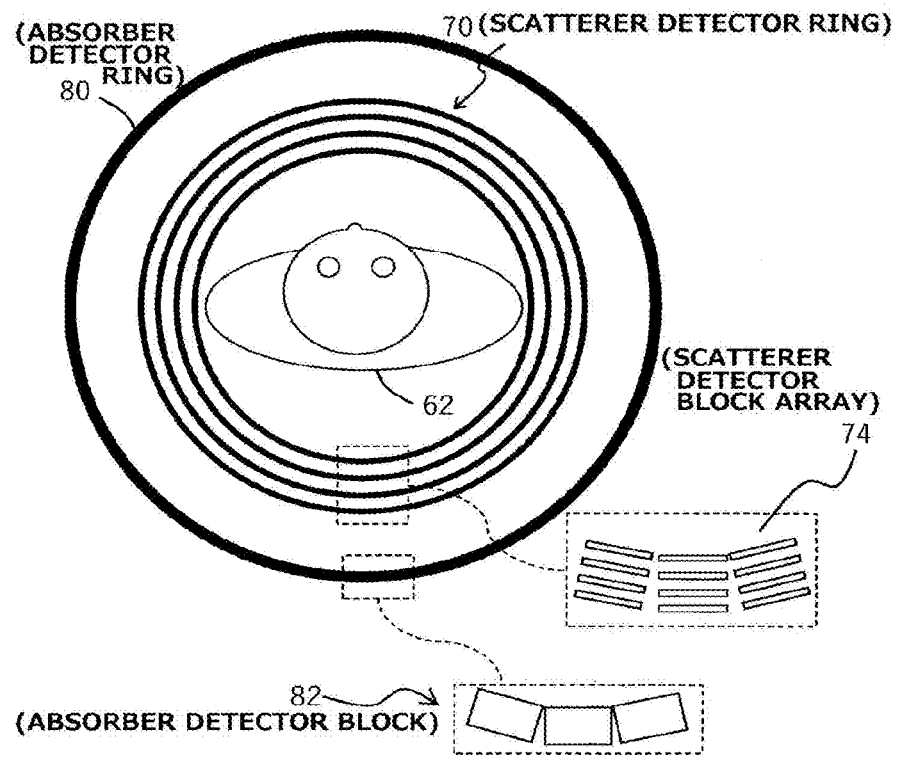
FIG. 14B is a cross-sectional view showing an example of a multi-ring detector layout for the same purpose.

To apply the techniques according to the embodiment of the present invention, PET events and Compton events need to be measurable from the same distribution. FIG. 14A shows an example of the most effective detector layout, where a scatterer detector ring 70 constituted by scatterer detector blocks 72 and an absorber detector ring 80 constituted by absorber detector blocks 82 are both disposed in an annular configuration, with the absorber detector ring 80 outside and the scatterer detector ring 70 inside. A patient 62 to be measured is located further inside. Here, as shown in FIG. 14B, scatterer detector block arrays 74 can be used to configure a multiple scatterer detector ring 70 for a multi-ring system. The latter multi-ring system not only facilitates scattering for improved sensitivity but enables layer-by-layer identification of scattering positions and is superior to simply increasing the ring thickness.

Figure 15A:
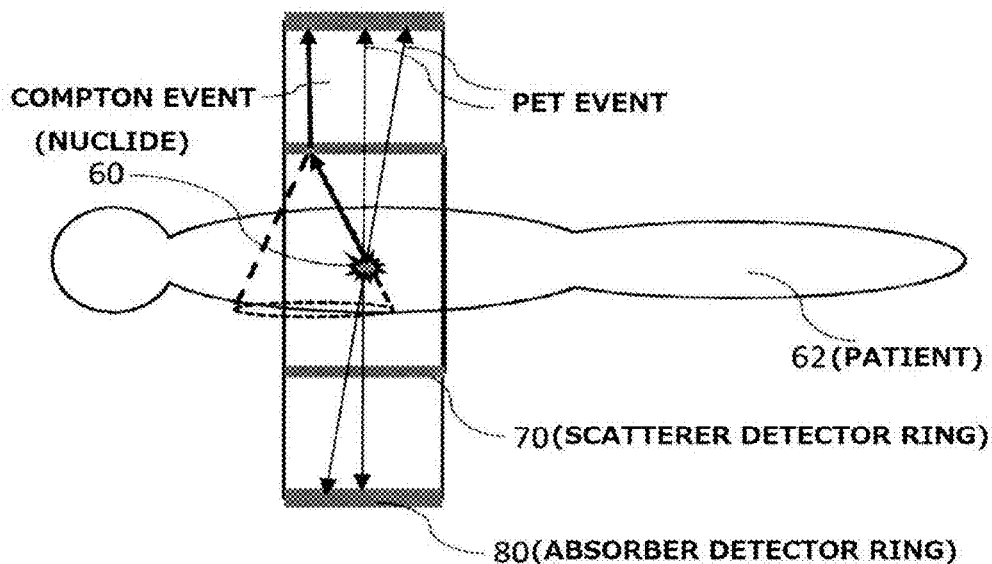
FIG. 15A is a longitudinal sectional view showing an example where a scatterer detector ring is disposed inside an absorber detector ring in a body axis direction for the same purpose.
Figure 15B:
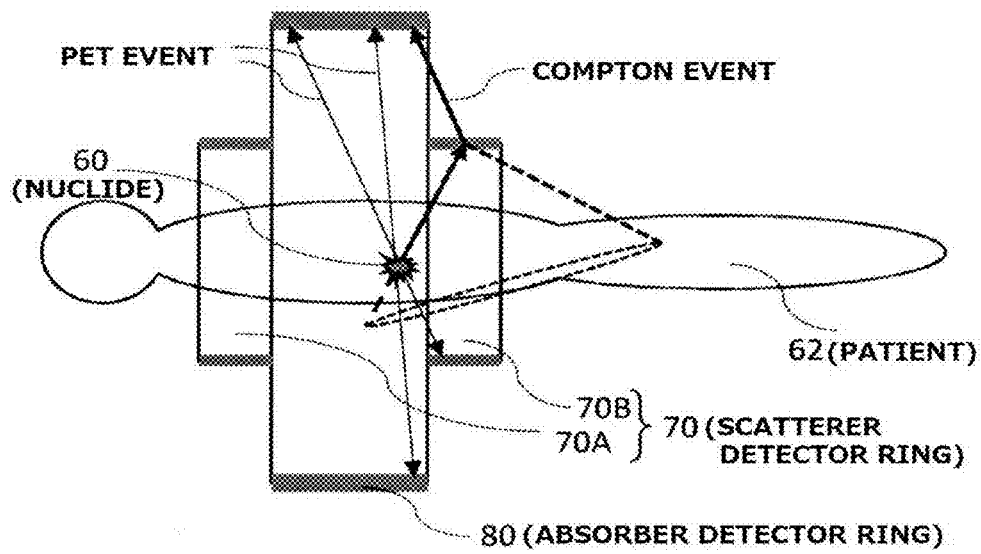
FIG. 15B is a longitudinal sectional view showing an example where scatterer detector rings are disposed outside an absorber detector ring for the same purpose.

Instead of the scatterer detector ring 70 being located inside the absorber detector ring 80 with their positions in the body axis direction of the patient 62 matched as shown in FIG. 15A, the scatterer detector ring 70 and the absorber detector 80 may be disposed so that the scatterer detector ring 70 is divided into two rings 70A and 70B and located outside the absorber detector ring 80 in the body axis direction of the patient as shown in FIG. 15B. Such a configuration prevents the absorber detector ring 80 from being interfered with by the scatterer detector rings 70A and 70B, and the sensitivity of the absorber detector ring 80 for a PET event can be maximized.

Figure 16A:
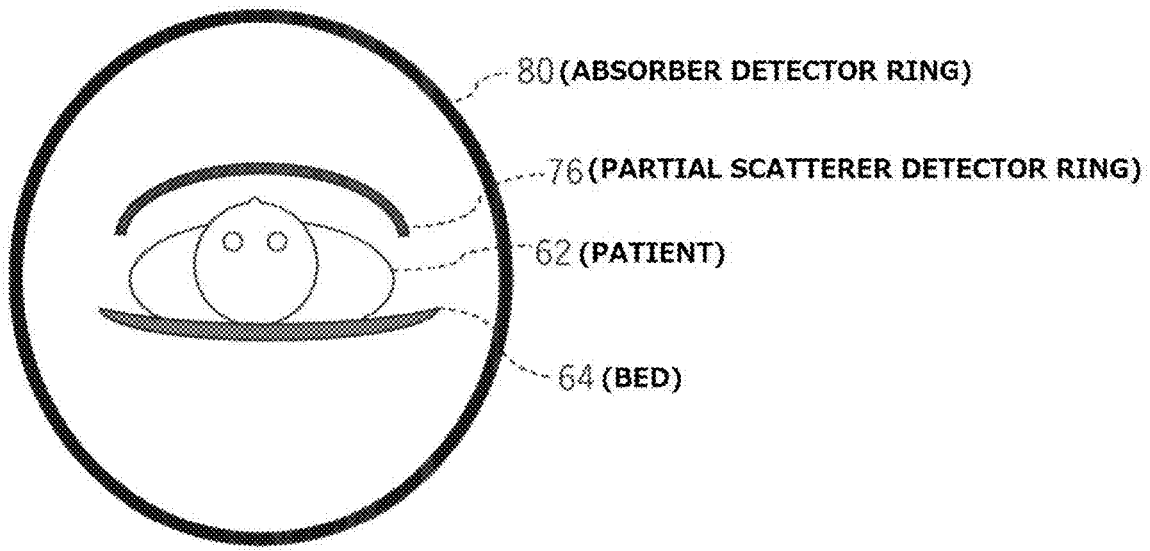
FIG. 16A is a cross-sectional view showing an example of detector layout with a partial scatterer detector ring for the same purpose.
Figure 16B:
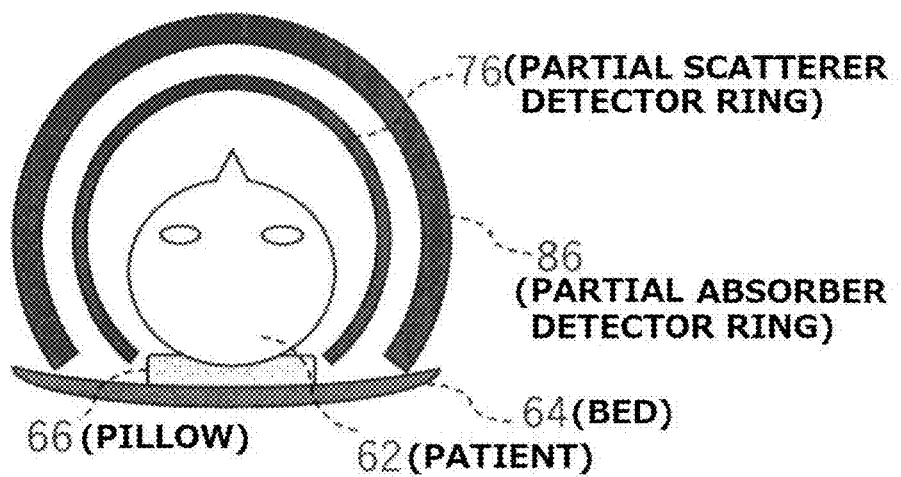
FIG. 16B is a cross-sectional view showing an example of detector layout with partial detector rings for the same purpose.
Figure 16C:
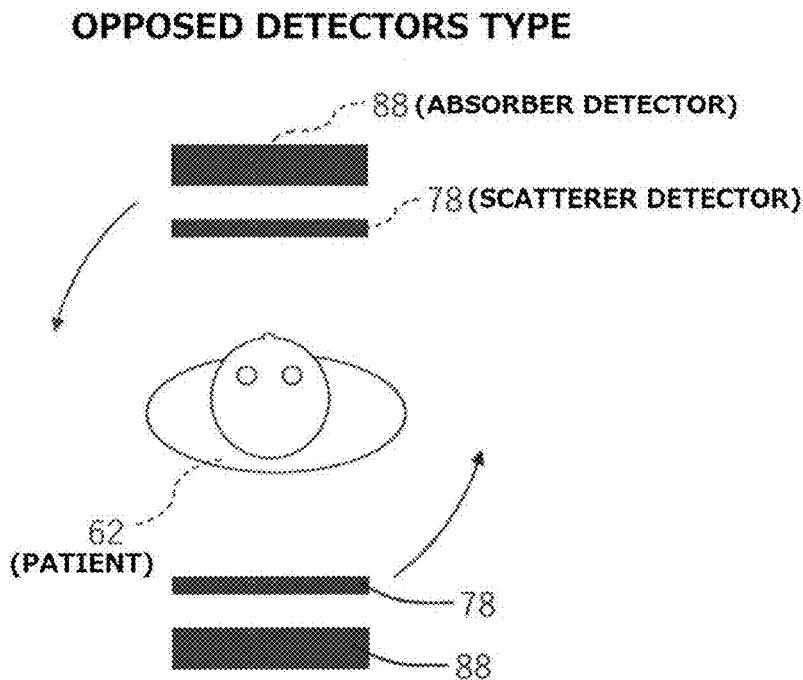
FIG. 16C is a cross-sectional view showing an example of opposed detector layout for the same purpose.

Instead of the annular configuration, only the scatterer detectors may be configured as a partial ring 76 as shown in FIG. 16A or both the scatterer detectors and the absorption detects may be configured as partial rings 76 and 86 as shown in FIG. 16B, for example, and disposed only in a location of easy installation. As shown in FIG. 16C, scatterer detectors 78 and absorber detectors 88 of non-annular shapes may be disposed in an opposed configuration. The detectors disposed in an opposed configuration may be rotated relative to the patient 62 (the patient 62 may be rotated) during measurement. FIG. 16B shows a bed 64 and a pillow 66.

Figure 17A:
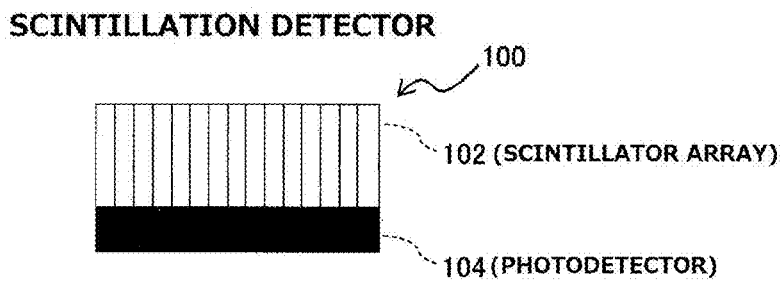
FIG. 17A is a sectional view showing as example of a scintillation detector used as a detector.
Figure 17B:
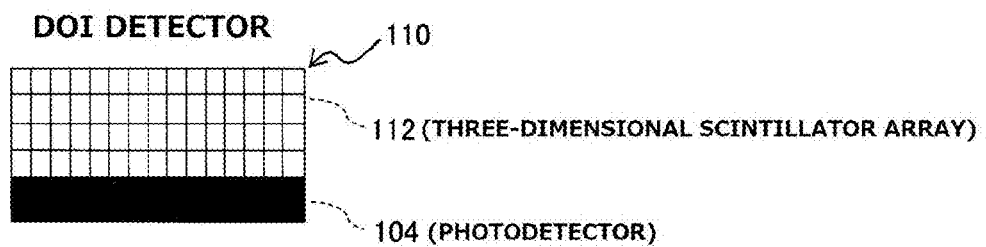
FIG. 17B is a sectional view showing an example of a DOI detector used as a detector.
Figure 17C:
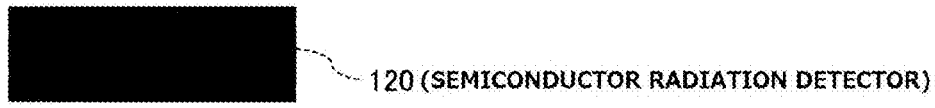
FIG. 17C is a sectional view showing an example of a semiconductor detector used as a detector.

Examples of the detectors to be used include: a scintillation detector 100 constituted by a scintillator array 102 and a photodetector 104, which is commonly used as a PET detector, as shown in FIG. 17A; a three-dimensional DOI (Depth-of-Interaction) detector 110 including a three-dimensional scintillator array 112 as shown in FIG. 17B; and a semiconductor radiation detector 120 as shown in FIG. 17C.

Figure 18A:
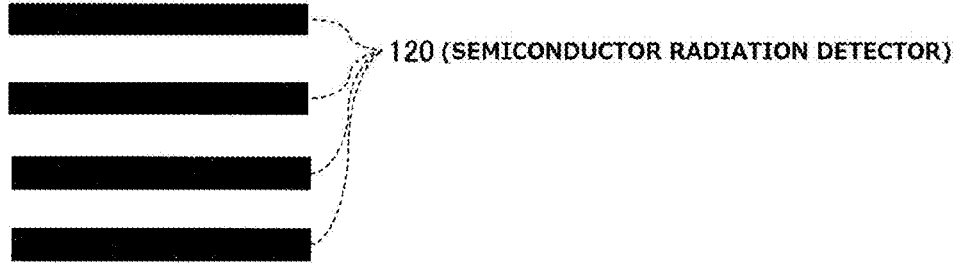
FIG. 18A is a sectional view showing a configuration example of multi-ring detectors using semiconductor detectors for carrying out the present invention.
Figure 18B:
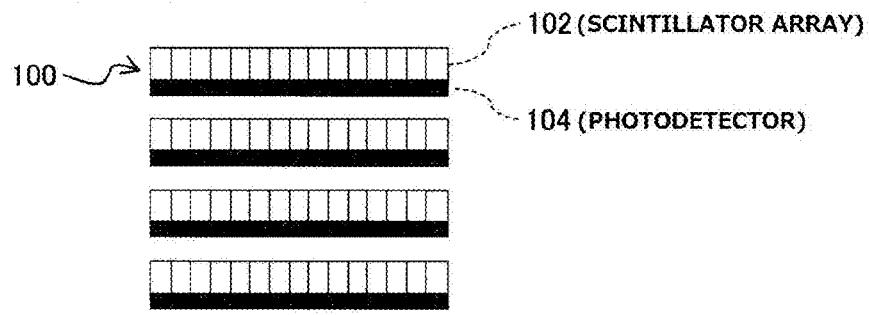
FIG. 18B is a sectional view showing a configuration example of multi-ring detectors using scintillation detectors for the same purpose.

The multi-ring system can be implemented by arranging semiconductor radiation detectors 120 at appropriate distances as shown in FIG. 18A, or similarly arranging scintillation detectors 100 at appropriate distances as shown in FIG. 18B. Liquid xenon or gas scintillation detectors can also be used. The detectors can be configured as scatterer detectors or absorber detectors. In any configuration, parameters such as the thicknesses and widths of the detectors, the distances between the detectors, and the distances from the measurement target are desirably adjusted to optimize the sensitivities of a Compton event and a PET event.

Figure 19:
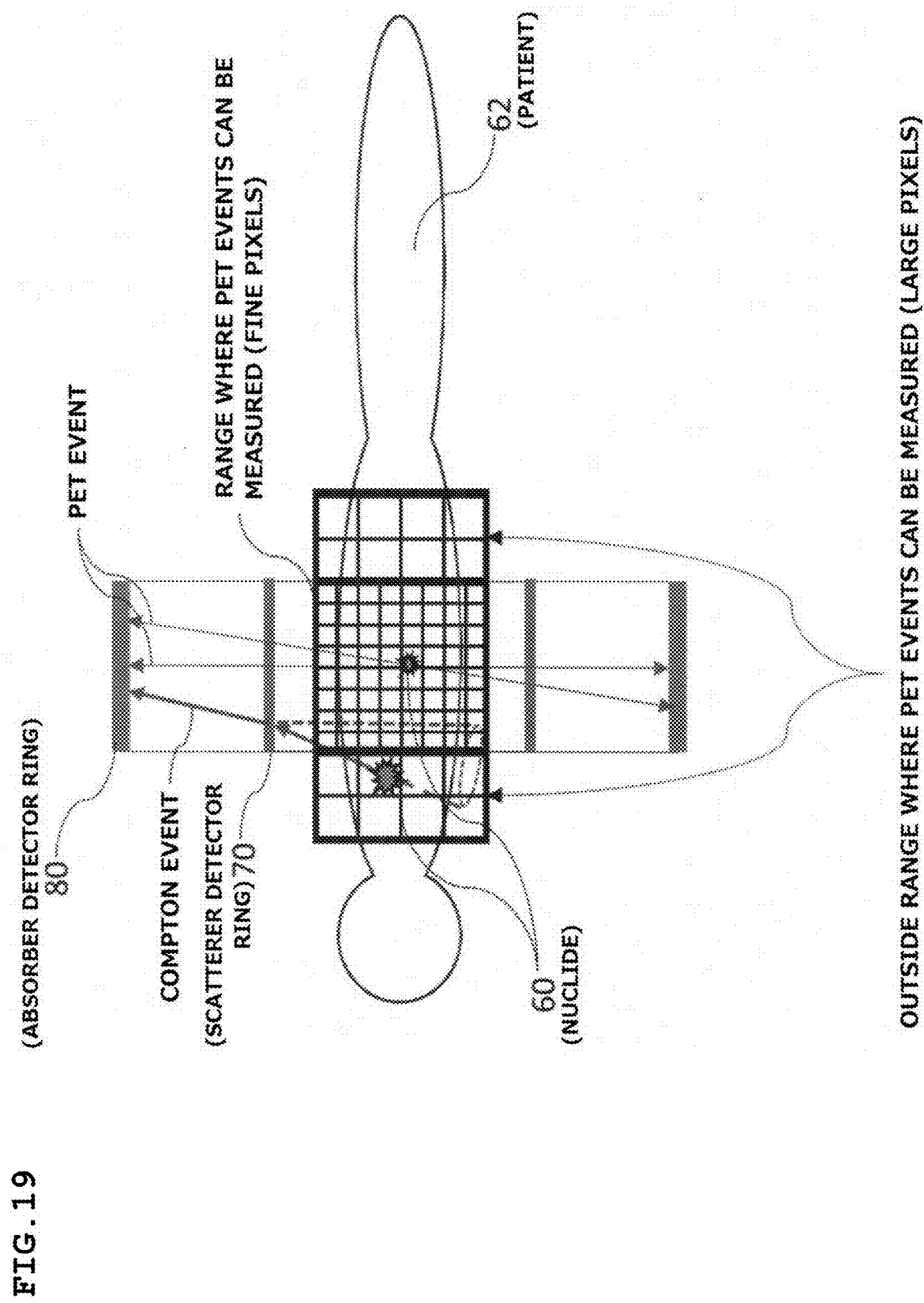
FIG. 19 is a horizontal sectional view showing an example where pixels outside a range where PFT events can be measured are increased in size to reduce the amount of calculation for image reconstruction according to the embodiment of the present invention.

Measurable field of view of a Compton event is wider than that of a PET event. However, the spatial resolution deteriorates in proportion to the distance from the detectors. So, the pixel size can be increased to reduce the amount of calculation in performing image reconstruction outside the range where PET events can be measured as shown in FIG. 19.

Both PET events and Compton events need coincidence measurement. However, a hardware coincidence circuit is considered to be difficult to implement. The reason is that complicate processing is needed, like a Compton event can desirably be extracted as a PET event depending on the energy as illustrated in the flowchart of FIG. 13. For implementation, all measurements are therefore collected as single events, and the coincidence processing is performed by postprocessing or on-the-fly software coincidence calculation. A hybrid image reconstruction method for reconstructing an image by efficiently combining PET events and Compton events extracted by the processing of the flowchart of FIG. 13 and the like can be implemented using the equations shown in FIG. 3 or 6, for example. Here, the hybrid image reconstruction method is implemented on the basis of list-mode OSEM.

The hybrid image reconstruction technique is characterized in that updated images are produced using a PET event and a Compton event independently of each other in each sub iteration and added to produce a new updated image by weighted averaging. Here, various correction methods such as sensitivity correction, absorption correction, and scattering correction can be independently applied. Since the updated images have the same dimensions and quantitative properties, a stable solution can be easily obtained by combining the updated images. Aside from the list-mode OSEM, various iterative approximation methods such as MAP-EM (Maximum a Posterior-Expectation Maximization) using a priori information about images can be applied.

Detectors capable of obtaining TOF (Time Of Flight) information can also be used. As shown in FIG. 9, this enables an application such that PET events are classified into ones with TOF information and ones without TOF information, and updated images are produced using the respective events and averaged with weights along with an image updated by a Compton event. In particular, the separate application of the hybrid image reconstruction techniques depending on the presence or absence of TOF information is considered to be effective if high energy resolution is required of the scatterer detectors and is difficult to be achieved in a compatible mariner with time resolution.

If a nuclide that simultaneously emits single gamma-rays and positrons, such as $^{44}$Sc, is used and a PET event and a single gamma-ray Compton event coincide in the same time window, the position of the radiation source can be limited to an intersection of the LOR and the Compton cone. As shown in FIG. 10, a 3-gamma event can thus be extracted and included into the weighted averaging as another updated image.

Figure 20:
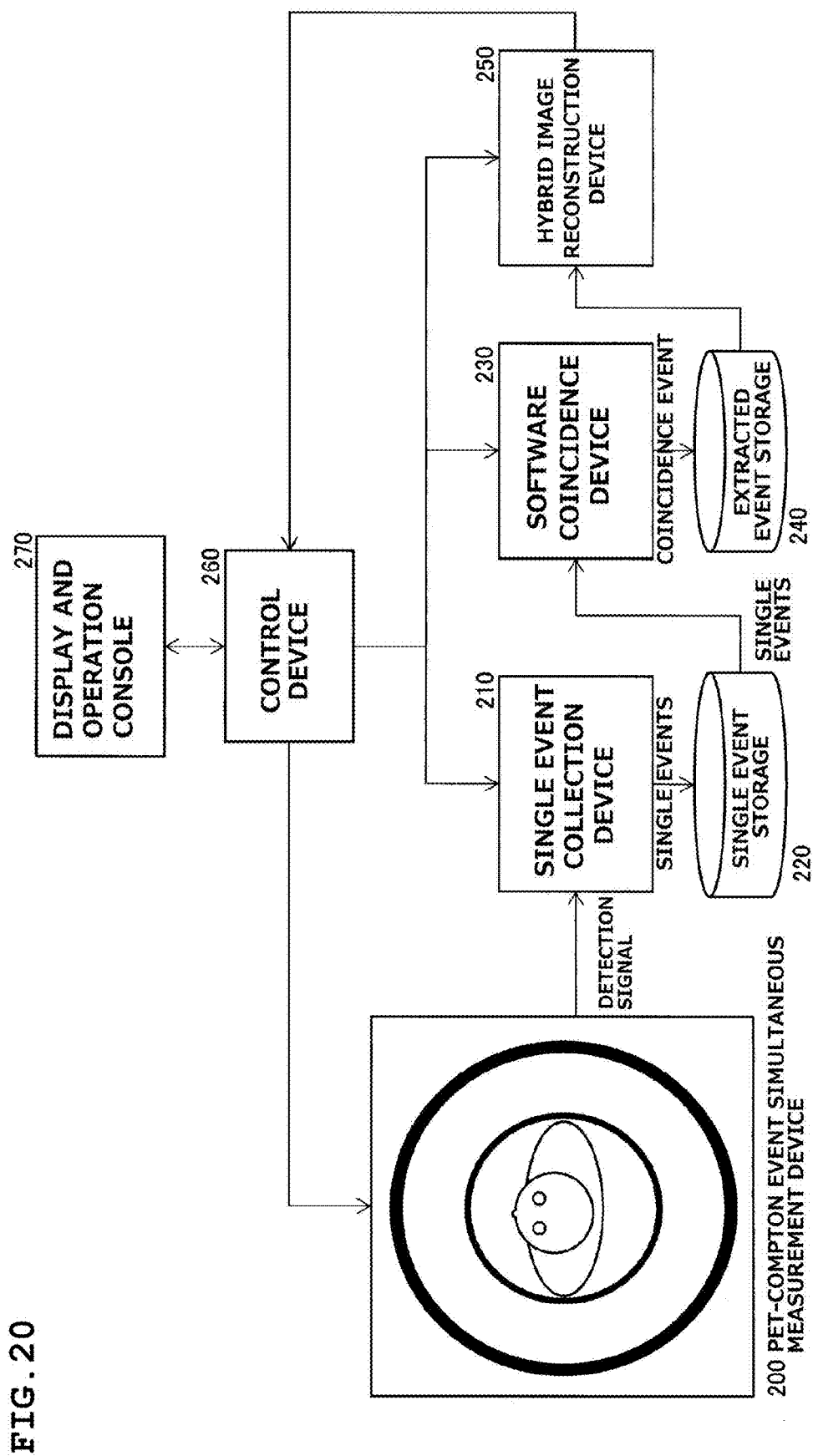
FIG. 20 is a diagram showing an overall configuration of an embodiment of a nuclear medicine device according to the embodiment of the present invention.

FIG. 20 shows an overall configuration of an embodiment of a nuclear medicine device using medical image processing according to the embodiment of the present invention. This embodiment includes: a PET-Compton event simultaneous measurement device 200 such as described above; a single event collection device 210 that collects single events on the basis of output of the PET-Compton event simultaneous measurement device 200; a single event storage 220; a software coincidence device 230 that detects coincidence by software on the basis of output of the single event storage 220; an extracted event storage 240; a hybrid image reconstruction device 250 that performs the hybrid image reconstruction according to the embodiment of the present invention on the basis of output of the storages 220 and 240; a control device 260 that controls the PET-Compton event simultaneous measurement device 200, the single event collection device 210, the software coincidence device 230, and the hybrid image reconstruction device 250; and a display and operation console 270 connected to the control device 260.

Figure 21:
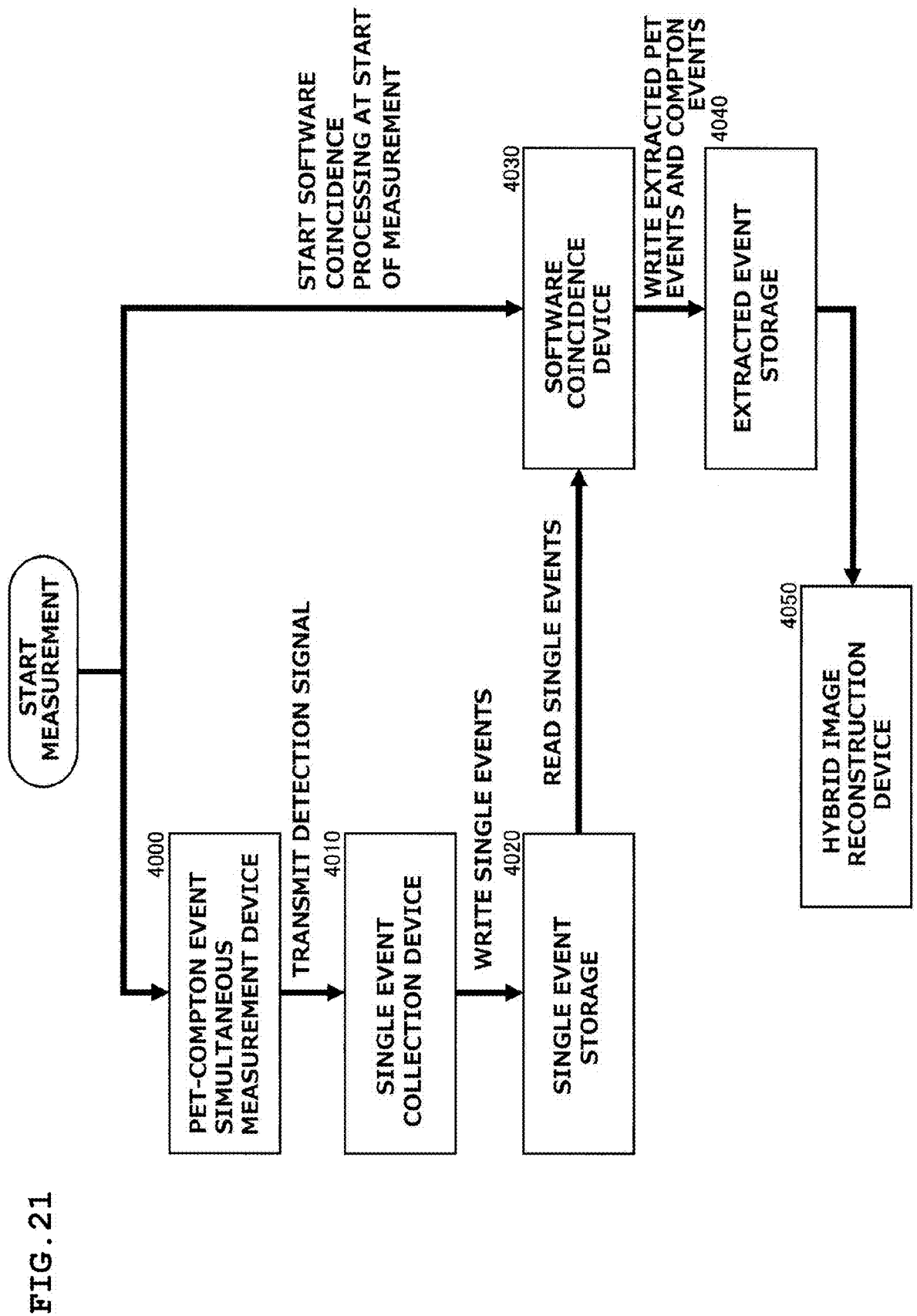
FIG. 21 is a flowchart showing a processing procedure of the same.

This nuclear medicine device performs on-the-fly software calculation as shown in FIG. 21. Initially, in step 4000, the PET-Compton event simultaneous measurement device 200 performs measurement. In step 4010, the detection signal is transmitted to the single event collection device 210 to collect single events.

In step 4020, the single event collection device 210 writes single events into the single event storage 220.

Meanwhile, the software coincidence device 230 starts software coincidence processing at the start of measurement. In step 4030, the software coincidence device 230 extracts PET events and Compton events based on the single events read from the single event storage 220. In step 4040, the software coincidence device 230 writes the extracted events into the extracted event storage 240.

The processing then proceeds to step 4050, where the hybrid image reconstruction device 250 performs the hybrid image reconstruction according to the embodiment of the present invention using the PET events and Compton events.

Figure 22:
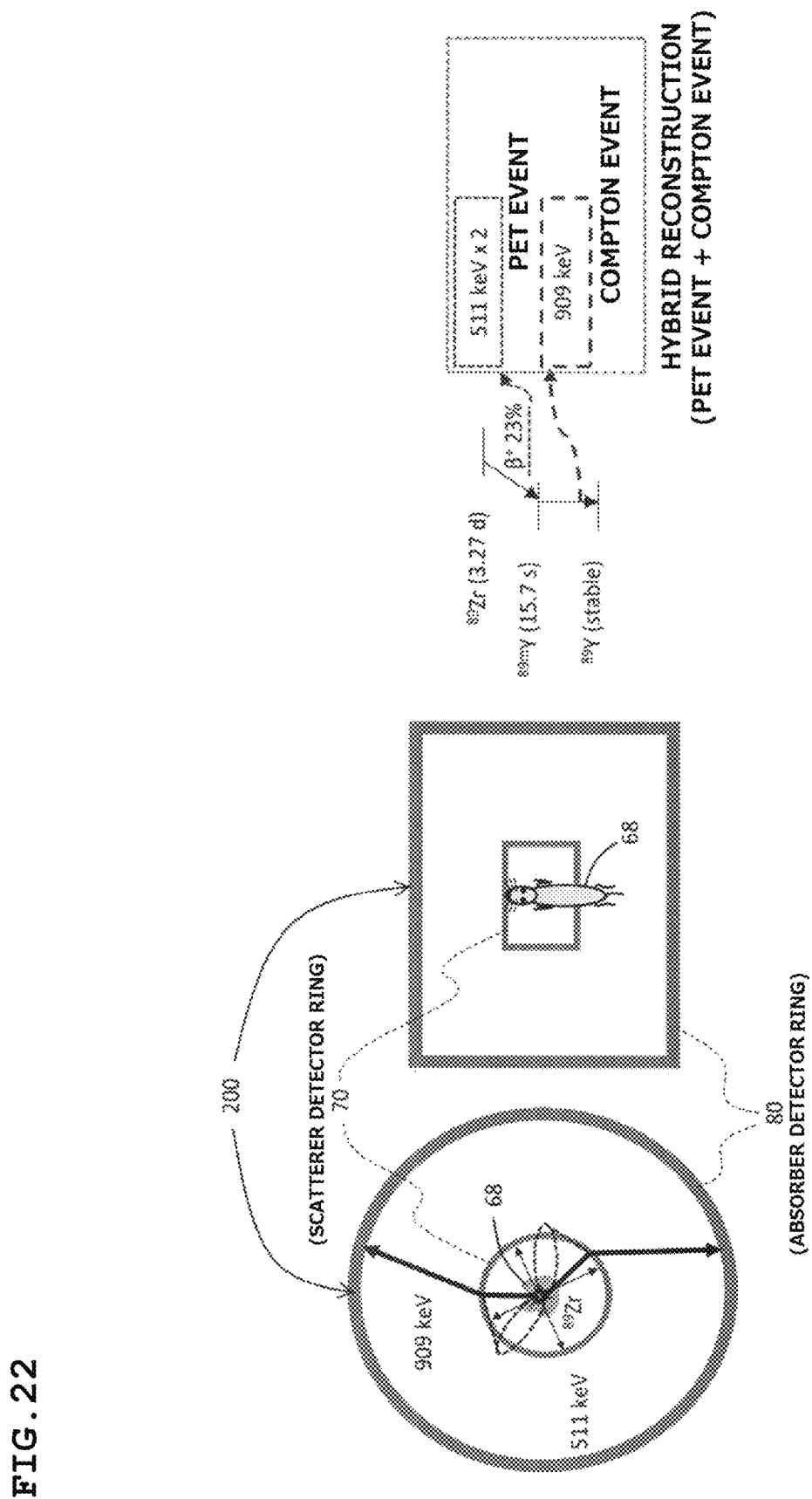
FIG. 22 is a diagram showing a demonstrative experiment setup for the nuclear medicine device according to the embodiment of the present invention.

FIG. 22 shows a schematic diagram of a demonstrative experiment setup for hybrid reconstruction where a small animal is measured using a double-ring PET-Compton event simultaneous measurement device 200. A mouse 68 to which 9.8 MBq of $^{89}$Zr-oxalate was administered was placed in a scattering detection ring 70, which had a width covering only the upper half of the body in the body axis direction, 22 hours after the administration with an absorption ring 80 disposed outside as a double-ring embodiment, and measured for five minutes. Since $^{89}$Zr has a sufficient time difference between decay including positron decay and subsequent decay accompanied by emission of 909-key single gamma-rays, PET events and Compton events occurring from the same distribution can be independently measured.

To demonstrate the efficiency and safety of the hybrid reconstruction technique, PET events only between the scatterer detectors inside were extracted. For Compton events, only 909-keV single gamma-rays were extracted.

Figure 23A:
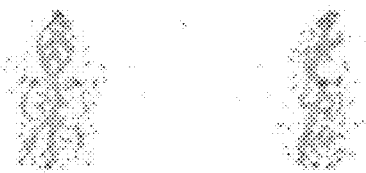
FIG. 23A is a diagram showing a result of reconstruction using only PET events in measurement data obtained by the demonstrative experiment.
Figure 23B:
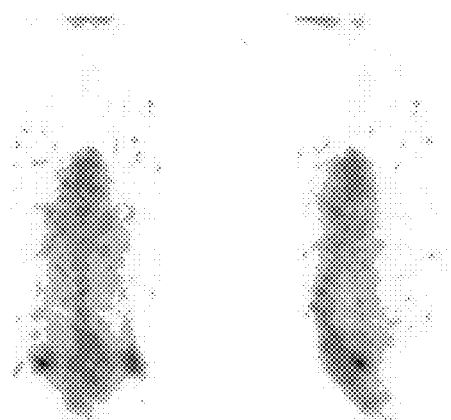
FIG. 23B is a diagram showing a result of reconstruction using only Compton events therein.
Figure 23C:
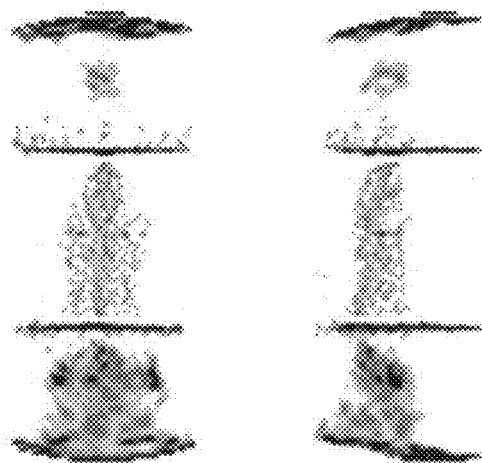
FIG. 23C is a diagram showing a result of application of simple simultaneous reconstruct on (conventional method) thereto.
Figure 23D:
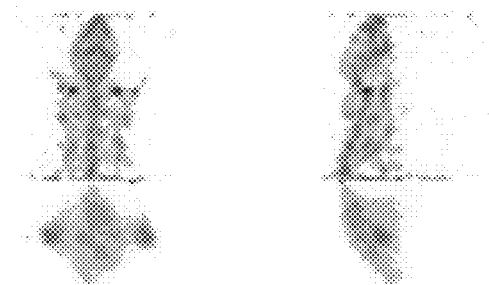
FIG. 23D is a diagram showing a result of application or the hybrid reconstruction (method of the present invention) thereto.

FIG. 23A shows images obtained in the case of using PET events. FIG. 23B shows images obtained in the case of using Compton events. FIG. 23C shows images obtained in the case of performing image reconstruction (simple simultaneous reconstruction) according to a conventional method by simply combining two events into one system. FIG. 23D shows images obtained in the case of performing reconstruction by the hybrid image reconstruction method according to the embodiment of the present invention. From the result of the reconstruction using PET events in FIG. 23A, up to which part of the upper body of the mouse is in the scatterer detector ring can be seen. In the case of using Compton events shown in in FIG. 23B, it can be seen that the images of the parts outside the scatterer detector ring can also be obtained. By the conventional simple simultaneous reconstruction shown in FIG. 23C, the image quality inside the ring was somewhat improved but strong artifacts appeared at the ends of the scatterer detector ring. By contrast, in the images obtained by the hybrid image reconstruction technique according to the embodiment of the present invention shown in FIG. 23D, artifacts at the ring ends were suppressed. It can also be seen that the image inside the scatterer detector ring was reconstructed with higher image quality than by the simple simultaneous reconstruction of FIG. 23G. It can be seen that the images outside the scatterer detector ring were also successfully obtained without much artifact. From the result of this demonstrative experiment, it is confirmed that PET events and Compton events can be efficiently and stably combined by the technique according to the embodiment of the present invention.

For the iterative approximation image reconstruction method, a list-mode method can be used, for example. However, the image reconstruction method is not limited thereto.

INDUSTRIAL APPLICABILITY

A new nuclear medicine device combining the principles of PET and a Compton camera can be implemented by using the hybrid image reconstruction technique of the present invention. This device can improve the sensitivity of inspections using a normal PET nuclide and stably improve image quality. In addition, when a nuclide that emits single gamma-rays from the same distribution, such as $^{89}$Zr, is used, the device is expected to significantly improve image quality since components that only cause noise in an ordinary PET device can be effectively used for imaging. In particular, long half-life nuclides such as $^{89}$Zr having a half-life of 3.3 days enable follow-up over a long period where commonly-used $^{18}$F-FDG with a half-life of 110 minutes is unable to be measured due to attenuation. Demand for such a device is expected to grow in the future for various pharmacokinetic analyses and inspections. The present technique absolutely essential for the implementation of the device can be expected to become industrially important.

REFERENCE SIGNS LIST

60 . . . nuclide
62 . . . patient
64 . . . bed
68 . . . mouse
70, 70A, 70B . . . scatterer detector ring
72 . . . scatterer detector block
74 . . . scatterer detector block array
76 . . . partial scatterer detector ring
78 . . . scatterer detector 80 ... absorber detector ring
82 ... absorber detector block
86 ... partial absorber detector ring
88 ... absorber detector
100 ... scintillation detector
102 ... scintillator array
104 ... photodetector
110 ... DOI detector
120 ... semiconductor radiation detector
200 ... PET-Compton event simultaneous measurement device
210 ... single event collection device
220 ... single event storage
230 ... software coincidence device
240 ... extracted event storage
250 ... hybrid image reconstruction device
260 ... control device

The invention claimed is:

1. A medical image processing device for reconstructing an image by iterative approximation using a PET event where a coincidence signal of a pair of annihilation radiations is obtained and a Compton event is obtained by Compton scattering, the medical image processing device comprising:
a computer configured to perform a set of functions, comprising:
produce a PET event updated image by updating a current image using a PET event;
produce a Compton event updated image by updating the current image using a Compton event;
weight and add the PET event updated image and the Compton event updated image produced independently of each other;
update the current image using an image obtained by the weighting and adding of the PET event updated image and the Compton event updated image; and
iterate processing of the PET event updated image, the Compton event updated image, the weighting and adding of the PET event updated image and the Compton event updated image, and the updating of the current image using the image obtained by the weighting and adding of the PET event updated image and the Compton event updated image.

2. The medical image processing device according to claim 1, wherein the computer is further configured to set a number of subsets as an update parameter for either the production of the PET event updated image or the production of the Compton even updated image.

3. The medical image processing device according to claim 2, wherein the computer is configured to make a sub iteration of image update using the subsets for either the production of the PET event updated image or the production of the Compton event updated image.

4. The medical image processing device according to claim 2, wherein the number of subsets that is the update parameter, a number of times of sub iterations, and timing of weighted addition can be set for the PET event and the Compton event independently.

5. The medical image processing device according to claim 1, wherein the Compton event includes an annihilation radiation Compton event and a single gamma-ray Compton event.

6. A nuclear medicine device comprising:
a PET-Compton simultaneous measurement device including scatterer detectors and absorber detectors; and
the medical image processing device according to claim 5.

7. The nuclear medicine device according to claim 6, wherein at least either the scatterer detectors or the absorber detectors are arranged in a ring shape, a partial ring shape, or an opposed shape.

8. The nuclear medicine device according to claim 6, wherein the scatterer detectors are arranged in a multi-ring shape.

9. The nuclear medicine device according to claim 6, wherein the scatterer detectors are located inside a measurement field of view of the absorber detectors.

10. The nuclear medicine device according to claim 6, wherein the scatterer detectors are located outside a measurement field of view of the absorber detectors.

11. The nuclear medicine device according to claim 6, wherein a measurement field of view of the Compton event is made greater than a measurement field of view of the PET event.

12. The nuclear medicine device according to claim 11, wherein a pixel size of the measurement field of view of the Compton event is made greater than that of the measurement field of view including the PET event.

13. The medical image processing device according to claim 1, wherein the PET event includes a PET event between absorber detectors, a PET event between a scatterer detector and an absorber detector, and a PET event between scatterer detectors.

14. The medical image processing device according to claim 1, wherein the PET event includes a PET event with time of flight information and a PET event without time of flight information.

15. The medical image processing device according to claim 1, wherein, if a nuclide is a 3-gamma-ray nuclide, a 3-gamma event is further included.

16. A non-transitory computer readable recording medium for recording a computer program for causing the computer to implement the set of functions of the medical image processing device according to claim 1.

* * * * *